US012345798B2

(12) United States Patent
Rogers et al.

(10) Patent No.: US 12,345,798 B2
(45) Date of Patent: Jul. 1, 2025

(54) FMCW RADAR WITH ELEVATION SCANNING

(71) Applicant: Honeywell International Inc., Charlotte, NC (US)

(72) Inventors: Shawn Rogers, Johns Creek, GA (US); Marc M. Pos, Duvall, WA (US); Darren Goshi, El Segundo, CA (US); David C. Vacanti, Renton, WA (US)

(73) Assignee: Honeywell International Inc., Charlotte, NC (US)

( * ) Notice: Subject to any disclaimer, the term of this patent is extended or adjusted under 35 U.S.C. 154(b) by 539 days.

(21) Appl. No.: 17/665,479

(22) Filed: Feb. 4, 2022

(65) Prior Publication Data

US 2023/0251368 A1     Aug. 10, 2023

(51) Int. Cl.
*G01S 13/42* (2006.01)
*G01S 7/03* (2006.01)
(Continued)

(52) U.S. Cl.
CPC ............ *G01S 13/426* (2013.01); *G01S 7/032* (2013.01); *G01S 7/35* (2013.01); *G01S 13/4409* (2013.01);
(Continued)

(58) Field of Classification Search
CPC .......... G01S 13/426; G01S 7/032; G01S 7/35; G01S 13/4409; G01S 13/4463;
(Continued)

(56) References Cited

U.S. PATENT DOCUMENTS 6,498,582 B1 * 12/2002 Sweeney ................. G01S 13/44
342/149
6,667,714 B1    12/2003 Solondz
(Continued)

FOREIGN PATENT DOCUMENTS

CN    109245793 A    1/2019
CN    109831234 A    5/2019
(Continued)

OTHER PUBLICATIONS

"Application Note—Varactor Diodes," from Skyworks Solutions, Inc., Aug. 15, 2008, retrieved from https://www.skyworkssinc.com/uploads/documents/200824A.pdf, 6 pp.
(Continued)

*Primary Examiner* — Timothy A Brainard
*Assistant Examiner* — Ismaaeel A. Siddiquee
(74) *Attorney, Agent, or Firm* — Shumaker & Sieffert, P.A.

(57) ABSTRACT

The disclosure describes techniques to scan a radio frequency antenna beam along one or more axes. For example, for a wide transmit beam oriented such that the long axis is in azimuth, this disclosure describes techniques to scan the transmit beam in elevation, in the direction of a short axis of the transmit beam. The radar receive aperture may be synchronized with transmit beam to scan the radar receive aperture using RF beamforming such that the elevation scan of the field of view of the radar receive aperture follows the elevation scan of the transmit beam. The radar receiver circuitry may also down-convert the received radar signals to an intermediate frequency (IF). The radar receiver circuitry may digitally form monopulse receive beams at IF within the processing circuitry of the receiver electronics and digitally scan the monopulse receive beams along the long axis of the field of view.

12 Claims, 17 Drawing Sheets

(51) Int. Cl.
*G01S 7/35* (2006.01)
*G01S 13/44* (2006.01)
G01S 13/34 (2006.01)
H01Q 1/32 (2006.01)
H01Q 1/52 (2006.01)
H01Q 3/36 (2006.01)
H01Q 21/08 (2006.01)
H01Q 21/28 (2006.01)

(52) U.S. Cl.
CPC .............. *G01S 13/4463* (2013.01); *G01S 7/03* (2013.01); *G01S 13/34* (2013.01); *G01S 13/4481* (2013.01); *H01Q 1/3233* (2013.01); *H01Q 1/525* (2013.01); *H01Q 3/36* (2013.01); *H01Q 21/08* (2013.01); *H01Q 21/28* (2013.01)

(58) Field of Classification Search
CPC ........ G01S 7/03; G01S 13/4481; G01S 13/34; H01Q 1/3233; H01Q 1/525; H01Q 3/36; H01Q 21/08; H01Q 21/28
See application file for complete search history.

(56) References Cited

U.S. PATENT DOCUMENTS

| | | | |
|---|---|---|---|
| 7,889,114 | B2 | 2/2011 | Meyers et al. |
| 7,907,100 | B2 | 3/2011 | Mortazawi et al. |
| 9,118,113 | B2 | 8/2015 | Mortazawi et al. |
| 9,229,101 | B2 | 1/2016 | Kirk et al. |
| 9,897,695 | B2 | 2/2018 | Vacanti |
| 9,972,917 | B2 | 5/2018 | Vacanti et al. |
| 10,050,336 | B2 | 8/2018 | Wang et al. |
| 10,461,420 | B2 | 10/2019 | Chen |
| 10,613,216 | B2 | 4/2020 | Vacanti et al. |
| 10,627,503 | B2 | 4/2020 | Vacanti et al. |
| 10,712,438 | B2 | 7/2020 | Vacanti et al. |
| 10,725,169 | B2 | 7/2020 | Goossen et al. |
| 10,754,020 | B2 | 8/2020 | Holt et al. |
| 10,775,498 | B2 | 9/2020 | Vacanti |
| 2009/0033556 | A1* | 2/2009 | Stickley ............. H01Q 21/0006 342/25 A |
| 2011/0148707 | A1* | 6/2011 | Thiesen ............... H01Q 3/2605 342/372 |
| 2015/0200455 | A1 | 7/2015 | Venkateswaran et al. |
| 2017/0160389 | A1* | 6/2017 | Vacanti .................... H01Q 1/42 |
| 2018/0259641 | A1* | 9/2018 | Vacanti ................. G01S 13/953 |
| 2019/0064338 | A1 | 2/2019 | Holt et al. |
| 2019/0113610 | A1 | 4/2019 | Vacanti et al. |
| 2019/0113618 | A1 | 4/2019 | Lukas et al. |
| 2019/0131721 | A1 | 5/2019 | Dani et al. |
| 2019/0277964 | A1 | 9/2019 | Badin et al. |
| 2020/0271777 | A1 | 8/2020 | Vacanti et al. |
| 2021/0257731 | A1 | 8/2021 | Lin et al. |
| 2021/0296783 | A1* | 9/2021 | Rostomyan .......... H01Q 1/2283 |

FOREIGN PATENT DOCUMENTS

| | | | | |
|---|---|---|---|---|
| EP | 2857857 | A1 * | 4/2015 | ......... G01S 13/0209 |
| EP | 3382420 | A1 | 10/2018 | |
| EP | 3460505 | A1 | 3/2019 | |
| RU | 2546999 | C1 | 4/2015 | |
| RU | 2582084 | C1 | 4/2016 | |
| WO | 2016/076054 | A1 | 5/2016 | |
| WO | 2019/120513 | A1 | 6/2019 | |
| WO | 2021247260 | A1 | 12/2021 | |

OTHER PUBLICATIONS

Corsini et al., "90 Degree Hybrid Coupler," Worcester Polytechnic Institute fulfillment for requirements for degree of Bachelor of Science, Apr. 25, 2013, 127 pp.
"Digital Beamforming," retrieved from https://www.radartutorial.eu/06.antennas/Digital%20Beamforming.en.html, on Nov. 15, 2019, 1 pp.
"Hybrid (3 dB) couplers," from Microwaves 101.com retrieved from https://www.microwaves101.com/encyclopedias/hybrid-couplers on Sep. 29, 2020, 7 pp.
Jayachitra et al., "Design and Development of Hybrid Coupler With FR4," International Journal of Advanced Research in Electronics and Communication Engineering (IJARECE), vol. 2, No. 12, Dec. 2013, 4 pp.
"Microwave Power Dividers and Couplers Tutorial—Overview and Definition of Terms," retrieved from https://www.markimicrowave.com/assets/appnotes/Microwave_Power_Dividers_and_Couplers_Primer.pdf. on Sep. 29, 2020, 8 pp.
"MIMO Radar Systems," retrieved from https://www.radartutorial.eu/02.basics/MIMO-radar.en.html, on Mar. 31, 2020, 1 pp.
"S-Parameters for Antennas," retrieved from http://www.antenna-theory.com/definitions/sparameters.php, on Nov. 8, 2019, 2 pp.
"The 90° Hybrid Coupler," retrieved from http://www.ittc.ku.edu/~jstiles/723/handbout/The%20Quadrature%20Hybrid%20Coupler%20723.pdf., on Apr. 17, 2009, 4 pp.
"Varactor diode," from Physics and Radio Electronics, retrieved from https://www.physics-and-radio-electronics.com/electronic-devices-and-circuits/semiconductor-diodes/varactordiode-construction-definition-working.html, on Nov. 8, 2019, 10 pp.
"Varactor Phase Shifters," from Microwaves101.com retrieved from https://www.microwaves101.com/encyclopedias/varactor-phase-shifters, Sep. 29, 2020, 4 pp.
"Wilkinson Power Divider, Splitter & Combiner," from Electronics Notes, retrieved from https://www.electronics-notes.com/articles/radio/rf-combiner-splitter-coupler-hybrid/wilkinson.php, on Dec. 5, 2019, 5 pp.
U.S. Appl. No. 15/960,214, filed Apr. 23, 2018, naming inventors Pos et al.
U.S. Appl. No. 16/917,021, filed Jun. 30, 2020, naming inventors Vacanti et al.
U.S. Appl. No. 17/001,781, filed Aug. 25, 2020, naming inventors Vacanti.
Daeung et al., "A New Design Method of the Unequal Wilkinson Power Divider Using an Arbitrarily Resistor Value", Microwave and Optical Technology Letters, vol. 58, No. 10, Oct. 2016, pp. 2450-2452.
Extended Search Report from counterpart European Application No. 22208371.9 dated Jun. 29, 2023.
Response to Extended Search Report dated Oct. 4, 2023, from counterpart European Application No. 22208371.9 filed Apr. 27, 2024, 24 pp.
Extended Search Report from counterpart European Application No. 22208371.9 dated Oct. 4, 2023, 20 pp.
Communication pursuant to Article 94(3) EPC from counterpart European Application No. 22208371.9 dated Dec. 19, 2024, 11 pp.
Response to Communication pursuant to Article 94(3) EPC dated Dec. 19, 2024, from counterpart European Application No. 22208371.9 filed Apr. 16, 2025, 19 pp.

* cited by examiner

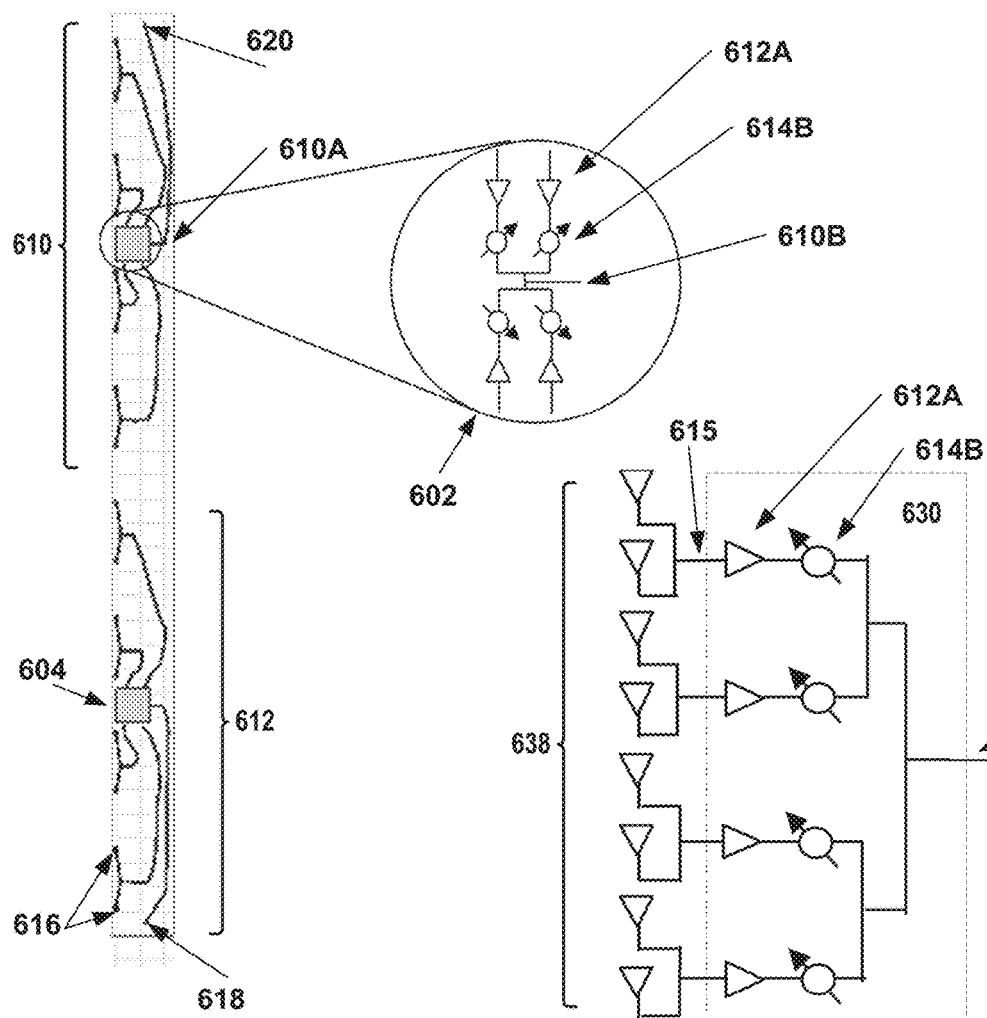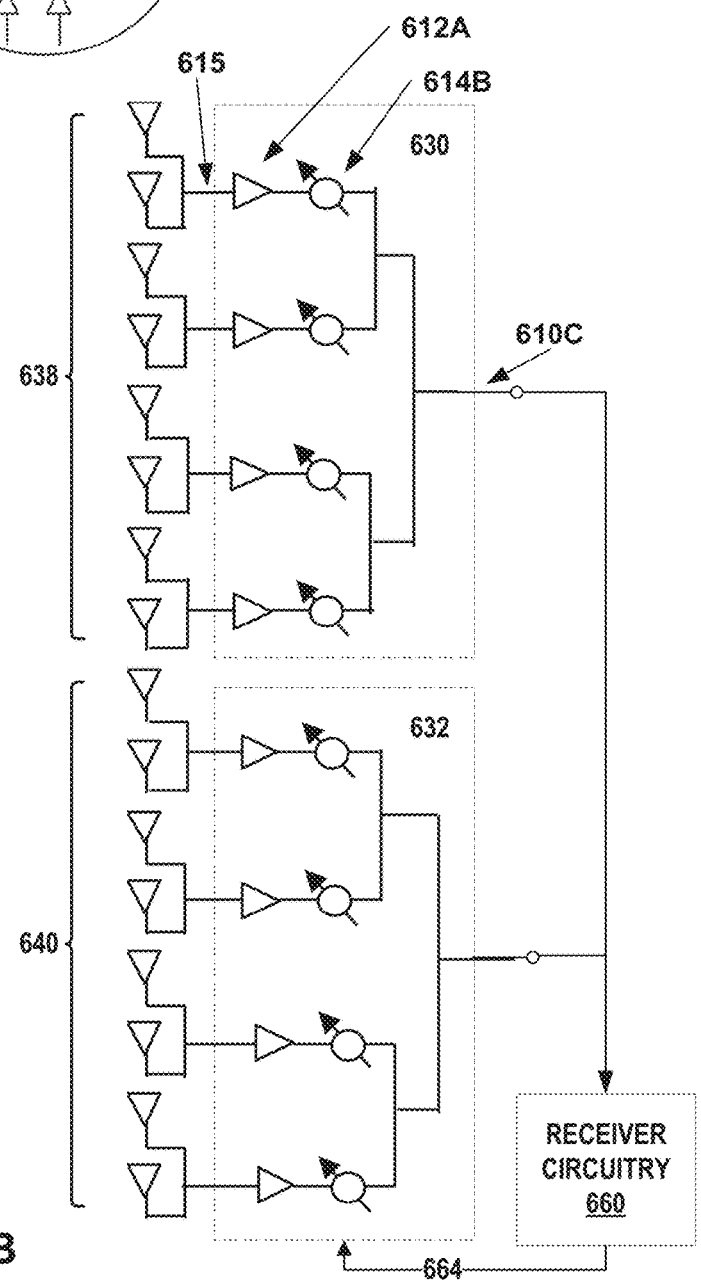
FIG. 6A
FIG. 6B

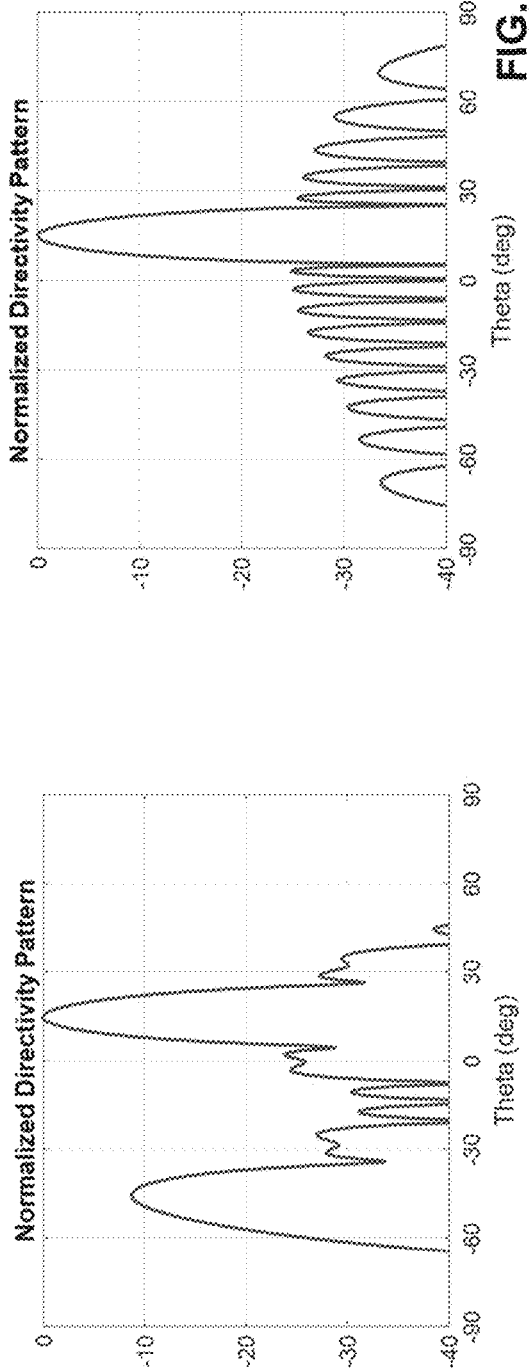
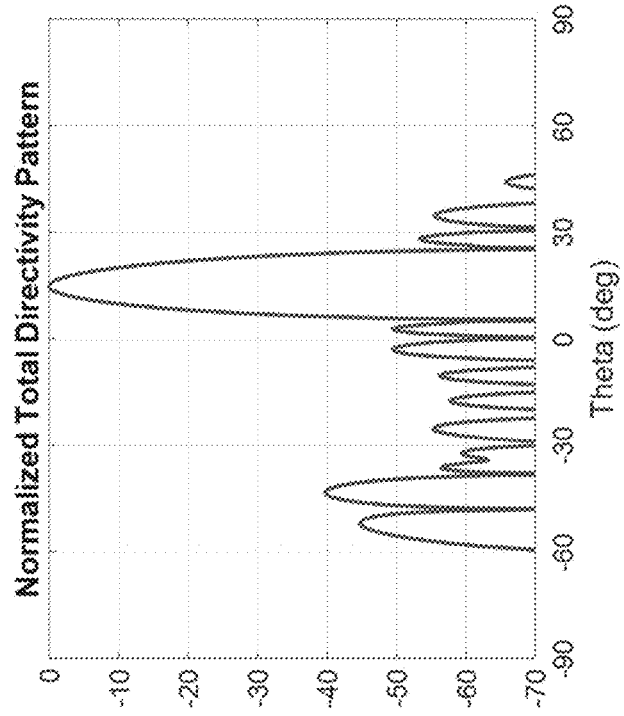
FIG. 9A
FIG. 9B
FIG. 9C

FMCW RADAR WITH ELEVATION SCANNING

GOVERNMENT RIGHTS

This invention was made with Government support under W911NF-17-2-0140 awarded by U.S. Army Research Laboratory. The Government has certain rights in the invention.

TECHNICAL FIELD

The disclosure relates to compact frequency modulated continuous wave (FMCW) radars.

BACKGROUND

Some examples of FMCW radars include a coplanar transmit array and receive array separated by an isolation zone. In some examples the transmitter electronics and transmit array are configured to transmit fixed, high aspect ratio transmit beam that is wider in a first direction and narrower in a second direction, where the second direction is perpendicular to the first direction. For example, the antenna may be oriented so that the fixed transmit beam illuminates a wide azimuth and a narrower elevation. In some examples, the receiver electronics are configured to perform electronic scanning of received radar energy reflected from objects in the field of regard (FOR) of the fixed transmit beam. For example, the receiver electronics may down-convert the received radar energy to an intermediate frequency (IF) and perform signal processing such as digital beam forming of monopulse receive beams, where the "receive beams" are scanned internally in the receiver electronics.

SUMMARY

In general, the disclosure describes techniques to scan a radio frequency antenna beam along one or more axes. For example, for a wide transmit beam oriented such that the long axis is in azimuth, this disclosure describes techniques to scan the transmit beam in elevation, in the direction of a short axis of the transmit beam. In some examples, the receiver circuitry of this disclosure may be synchronized with transmitter circuitry to scan a radar receive aperture using radio frequency (RF) beamforming such that receive array is configured to receive reflected radar signals transmitted from the transmit beam. In other words, the elevation scan of the field of view of the radar receive aperture follows the elevation scan of the transmit beam. The radar receiver circuitry of this disclosure may also down-convert the received radar signals to an intermediate frequency. The radar receiver circuitry may further digitally form monopulse receive beams at the intermediate frequency (IF) within the processing circuitry of the receiver electronics and digitally scan the monopulse receive beams along the long axis of the field of view.

In one example, the disclosure describes frequency modulated continuous wave (FMCW) transmit antenna array device, the device comprising: a first antenna element and a second antenna element; a first power divider comprising: a first input terminal; a first output terminal coupled to first antenna element; and a second output terminal; a second power divider, comprising: a second input terminal; a third output terminal coupled to second antenna element; and a fourth output terminal; and a phase shifter, wherein the phase shifter comprises: a phase shifter output terminal connected to the second input terminal of the second power divider; a 90-degree hybrid coupler with: a phase shifter input terminal connected to the second output terminal of the first power divider; a 90-degree output terminal; an isolated terminal; a first varactor that connects the 90-degree output terminal to ground; and a second varactor that connects the isolated terminal to ground.

In another example, the disclosure describes a system comprising: a frequency modulated continuous wave (FMCW) transmit antenna comprising: a plurality of transmit antenna elements aligned in a single column; a first multi-channel control device, comprising a first input terminal configured to receive a transmit signal from a power divider, the first multi-channel control device configured to individually adjust the phase and adjust the amplitude of the transmit signal through each respective channel, wherein each respective channel is connected to a respective transmit antenna element of a first group of transmit antenna elements of the plurality of transmit antenna elements; and a second multi-channel control device, comprising a second input terminal configured to receive the transmit signal from the power divider, the second multi-channel control device configured to individually adjust the phase and amplitude of the transmit signal through each respective channel of the second multi-channel control device, wherein each respective channel is connected to a respective transmit antenna element of a second group of transmit antenna elements of the plurality of transmit antenna elements, a receive array antenna separate from the transmit antenna, wherein the receive array antenna is configured to receive reflected FMCW transmit signals.

In another example, the disclosure describes a system comprising transmit antenna comprising: a plurality of transmit antenna elements aligned in a single column; a first multi-channel control device, comprising a first input terminal configured to receive a transmit signal from a power divider, the first multi-channel control device configured to individually adjust the phase and adjust the amplitude of the transmit signal through each respective channel, wherein each respective channel is connected to a respective transmit antenna element of a first group of transmit antenna elements of the plurality of transmit antenna elements; and a second multi-channel control device, comprising a second input terminal configured to receive the transmit signal from the power divider, the second multi-channel control device configured to individually adjust the phase and amplitude of the transmit signal through each respective channel of the second multi-channel control device, wherein each respective channel is connected to a respective transmit antenna element of a second group of transmit antenna elements of the plurality of transmit antenna elements, radar transmitter circuitry configured to output frequency modulated continuous wave (FMCW) transmit signals to the transmit antenna; radar receiver circuitry; a receive array antenna separate from the transmit antenna and operatively coupled to the radar receiver circuitry, wherein the receive array antenna is configured to receive reflected transmit signals and output the received reflected transmit signals to the radar receiver circuitry.

In another example, the disclosure describes a method of operating a frequency modulated continuous wave (FMCW) radar system, the method comprising: transmitting, by radar circuitry, a high aspect ratio transmit beam via a transmit antenna comprising a plurality of transmit antenna elements, wherein a long axis of the transmit antenna elements illuminates a field of view aligned with an elevation; scanning, by the radar circuitry, the transmit beam in elevation along a short axis of the transmit beam, wherein the radar circuitry causes the transmit beam to scan in elevation by adjusting a phase difference between each transmit element of the plurality of transmit antenna elements; scanning, by the radar circuitry, a radar receive aperture in elevation, wherein: the radar receive aperture is synchronized with the transmit beam such that the radar receive aperture is aligned with the field of view illuminated by the transmit beam, and wherein the radar circuitry causes the radar receive aperture to scan in elevation by adjusting a phase difference between each receive antenna element of a plurality of receive elements of a receive array antenna; receiving, by the radar circuitry, reflected radar signals from the receive array antenna; converting, by the radar circuitry, the reflected radar signals to an intermediate frequency, wherein the intermediate frequency is in an ultrasonic range of frequencies; forming, by the radar circuitry, digital monopulse receive beams based on the reflected radar signals; and scanning, by the radar circuitry, the digital monopulse receive beams in azimuth, wherein azimuth is aligned with the long axis of the transmit beam.

The details of one or more examples of the disclosure are set forth in the accompanying drawings and the description below. Other features, objects, and advantages of the disclosure will be apparent from the description and drawings, and from the claims.

BRIEF DESCRIPTION OF DRAWINGS

FIGS. 6A and 6B illustrate an example implementation of one column of a multi-column phased array receive antenna for scanning in elevation with amplitude and phase control at each element, according to one or more techniques of this disclosure.

FIGS. 9A, 9B, and 9C illustrate examples of normalized antenna array elevation pattern cuts for a 15° scan angle of a radar antenna system according to one or more techniques of this disclosure.

DETAILED DESCRIPTION

Figure 1:
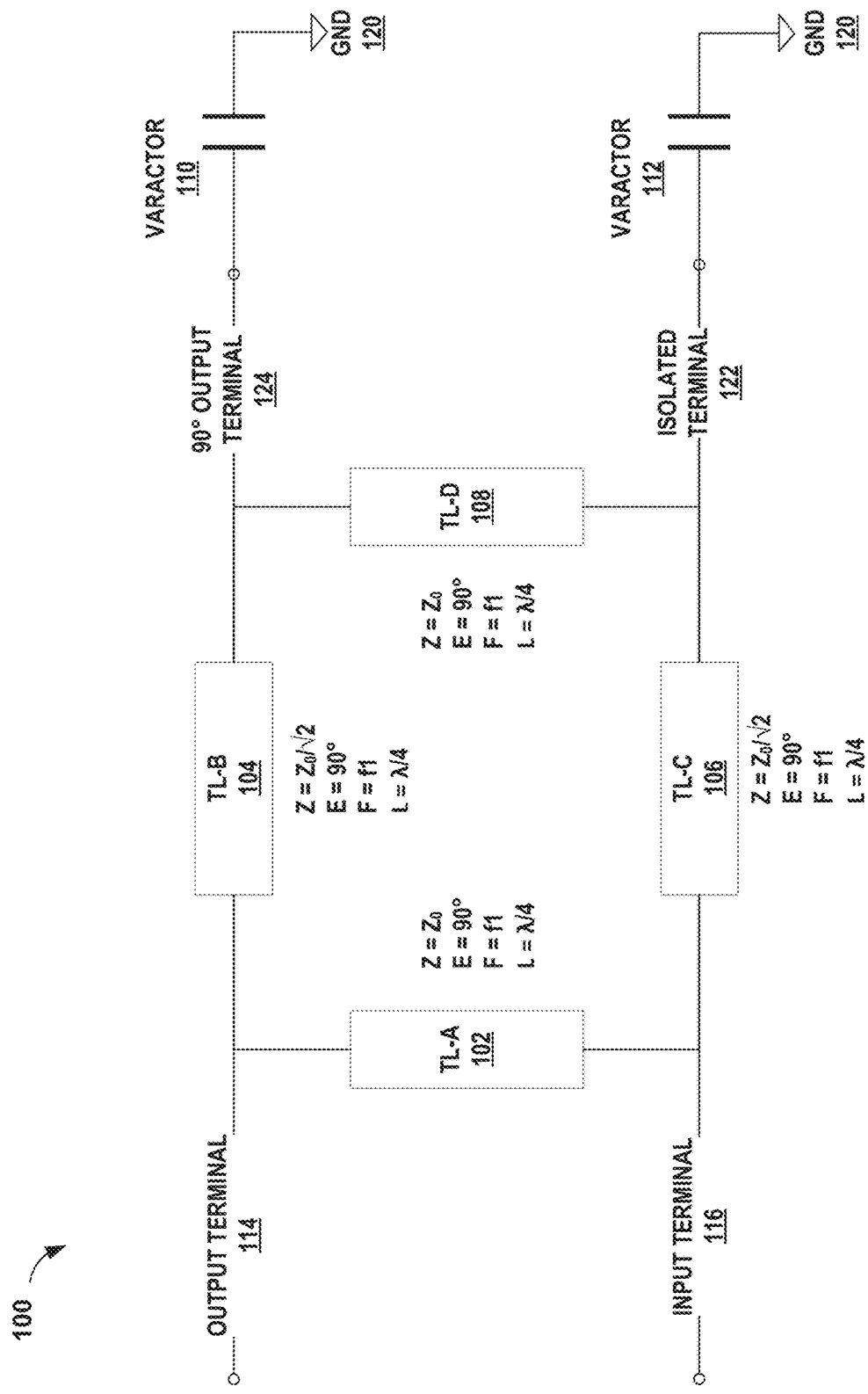
FIG. 1 is a block diagram illustrating a varactor phase shifter configured as a 90-degree hybrid coupler.

The disclosure describes techniques for configuring a radar device to scan a radio frequency antenna beam along one or more axes. For example, for a wide transmit beam oriented such that the long axis is in azimuth, this disclosure describes techniques for configuring the radar device to scan the transmit beam in elevation, in the direction of a short axis of the transmit beam. In some examples of this disclosure, the receiver circuitry of the radar device may be synchronized with transmitter circuitry to also scan a radar receive aperture using radio frequency (RF) beamforming such that a receive array is configured to receive reflected radar signals transmitted from the transmit beam. In other words, the elevation scan of the field of view of the radar receive aperture follows the elevation scan of the transmit beam. In this manner, a radar device using the techniques of this disclosure may efficiently receive the transmitted RF energy for a larger field of view than available with a fixed transmit beam.

In some examples, a radar device of this disclosure may scan the transmit beam by tuning either an amplitude or a phase or both of a transmit element of a transmit antenna to scan the transmit beam along the short axis. Similarly, the radar device may scan the receive aperture, also referred to as an RF receive beam in this disclosure, to be synchronized with the scan angle of the transmit beam. In contrast to other techniques, the transmit antenna may be separate from the receive antenna. Therefore, the phase and amplitude adjustment circuitry for the transmit antenna may also be separate from the phase and amplitude adjustment circuitry for the receive antenna. An example radar device of this disclosure may differ from other radars that use an array of antenna elements in which each element is configured to both transmit and receive RF energy and thus require any phase or amplitude adjustment circuitry to be used for both transmit and receive.

In other examples, a radar device of this disclosure may include a varactor phase shifter between antenna elements used to scan the transmit beam and the RF receive beam along the short axis of the beamwidth. As described above, the transmit antenna may be separate from the receive antenna. In some examples, each phase shifter may be set to the same phase in order to scan the beam to a given direction.

In addition to scanning the receive aperture using RF beamforming along the short axis, the radar receiver circuitry of this disclosure may also down-convert the received radar signals to an intermediate frequency. The radar receiver circuitry may further digitally form monopulse receive beams at the intermediate frequency (IF) within the processing circuitry of the receiver electronics and digitally scan the monopulse receive beams along the long axis of the field of view. In other words, the receiver circuitry of this disclosure may implement digital beam forming (DBF) at the intermediate frequency to internally scan digital monopulse receive beams as signal processing activity of the receiver circuitry. In this manner, the techniques of this disclosure describe transmit and RF receive beam scanning in a first direction along the short axis of the field of view along with scanning with signal processing in a second direction, perpendicular to the first direction, along the long axis of the field of view. In this disclosure, "field of view" may also be referred to as field of regard (FOR).

FIG. 1 is a block diagram illustrating a varactor phase shifter configured as a 90-degree hybrid coupler. Phase shifter circuit 100, (or circuit 100 for short) is one example of a 90-degree hybrid coupler. A 90-degree hybrid coupler may be called a quadrature coupler and may be implemented as a Lange coupler, a branchline coupler, an overlay coupler, an edge coupler, a short-slot hybrid coupler, and so on. The arrangement of circuit 100 includes varactor diodes 110 and 112, which are modeled as capacitors in the example of FIG. 1.

In the example of FIG. 1, phase shifter circuit 100 includes phase shifter output terminal 114, a phase shifter input terminal 116, 90-degree output terminal 124, isolated terminal 122, a first varactor 110 that connects 90-degree output terminal 124 to ground 120 and a second varactor 112 that connects isolated terminal 122 to ground 120. In the example of FIG. 1, ground 120 is a radio frequency (RF) signal ground.

Circuit 100 also includes four transmission lines, TL-A 102, TL-B 104, TL-C 106, and TL-D 108. Each transmission line has a length of one-quarter wavelength (L=λ/4) of the operating frequency, which may also be called the frequency of interest (F=f1). Each transmission line has an impedance of Z=Z0/√2, where Z0 is the RF characteristic impedance of the connecting circuitry. Each transmission line is set for E=90°, where E is a fixed phase shift at the frequency of interest, f1. In the example of FIG. 100, TL-A 102 connects input terminal 116 to output terminal 114. TL-B 104 connects output terminal 114 to 90-degree output terminal 124. TL-D 108 connects 90-degree output terminal 124 to isolated terminal 122. TL-C 106 connects input terminal 116 to isolated terminal 122.

Varactor diodes 110 and 112 may act as a variable capacitor. A varactor diode may operate only in reverse bias. The varactor diode acts like a variable capacitor under reverse bias. In some examples a varactor diode may be referred to as varicap diode, tuning diode, variable reactance diode, or variable capacitance diode. The capacitance of a varactor diode may be inversely proportional to the width of the depletion region and directly proportional to the surface area of the p-region and n-region. Therefore, the capacitance of varactor 110 and 112 may decrease as the as the width of depletion region increases. Thus, an increase in reverse bias voltage may increases the width of the depletion region and decreases the capacitance of a varactor diode.

Including a phase shifter circuit between antenna elements of either a transmit or receive antenna may provide the ability to scan the transmit beam and the RF receive beam along the short axis of the beam width. The particular arrangement of the varactor phase shifter circuit 100 may provide this phase shift capability and may avoid mismatch during phase tuning that may lead to RF losses as the RF beam is scanned. To efficiently scan the RF beam, the phase between each antenna element should be approximately equal. The arrangement of circuit 100 may avoid mismatch in the magnitude of phase shift between each phase shifter placed between each antenna element. Using the arrangement of circuit 100 may result in improved phase tuning range and therefore increased RF beam scan angle when compared to other techniques. Also, a varactor phase shifter based on circuit 100 may be less expensive than other techniques.

Figure 2:
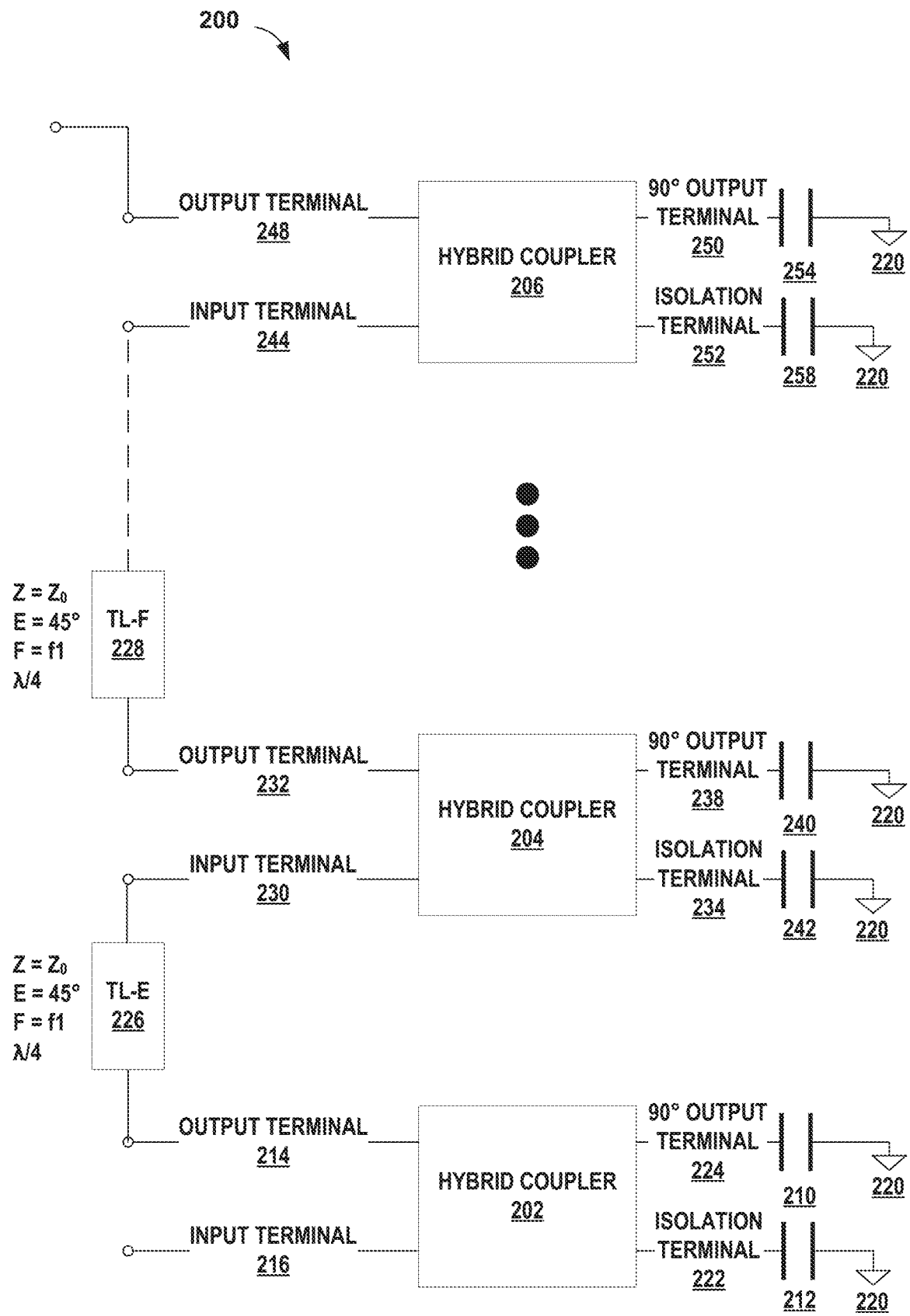
FIG. 2 is a block diagram illustrating a varactor phase shifter configured a cascaded arrangement of 90-degree hybrid couplers.

FIG. 2 is a block diagram illustrating a varactor phase shifter configured a cascaded arrangement of 90-degree hybrid couplers. Each stage of varactor phase shifter circuit 200 (circuit 200 for short) is an example of circuit 100 described above in relation to FIG. 1. Because the λ/4 structures may make the quadrature hybrid an inherently narrow-band device, the cascaded structure of circuit 200 with cascaded 90 degree hybrid couplers with varactors may create a good match characteristics over a wide phase tuning range when compared to the single stage varactor phase shifter circuit depicted in FIG. 1.

Circuit 200 includes phase shifter output terminal 248 and phase shifter input terminal 216. Circuit 200 further includes coupler input terminals and coupler output terminals that connect the coupler stages. Coupler input terminal 230 connects to output terminal 214 of the first 90-degree hybrid coupler 202 through the stage connector element TL-E 226. Similarly, terminal 232 connects to a coupler input terminal of another hybrid coupler (not shown in FIG. 2) through the stage connector element TL-F 228. In the example of circuit 200, the final hybrid coupler 206 connects to a previous hybrid coupler at coupler input terminal 244 via a stage connector element (not shown in FIG. 2). The phase shifter output terminal 248 is the output terminal of hybrid coupler 206. Each of hybrid couplers 202, 204, and 206 are examples of the hybrid couplers described above in relation to FIG. 1.

The first hybrid coupler stage, connected to phase shifter input terminal 216, includes hybrid coupler 202 with isolation terminal 222 connected to RF signal ground 220 through varactor 212. Hybrid coupler 202 also includes 90-degree output terminal 224 connected to ground 220 through varactor 210. Similarly, the second stage of circuit 200 includes hybrid coupler 204 with isolation terminal 234 connected to ground 220 through varactor 242 and 90-degree output terminal 240 connected to ground 220 through varactor 240. The final stage of circuit 200 includes hybrid coupler 206 with isolation terminal 252 connected to ground 220 through varactor 252 and 90-degree output terminal 250 connected to ground 220 through varactor 254. Between the second stage and final stage, circuit 200 may have many other hybrid coupler stages (not shown in FIG. 2).

Elements 212, 210, 242, 240, 258 and 254 are the capacitors representing the varactor diodes, which act as variable capacitors by varying the bias voltage to those varactors. These varactor diodes enable the variable phase shift of circuit 200.

In the example of FIG. 2, stage connector element 226 and 228 are transmission lines with a fixed 45-degree phase shift (E=45°) at the frequency of interest f1. Similar to transmission lines TL-A 102 to TL-D 108 described above in relation to FIG. 1, each stage connector element has a length of one-quarter wavelength (L=V4) of the frequency of interest (F=f1) and an impedance of Z=Z0/√2.

Figure 3A:
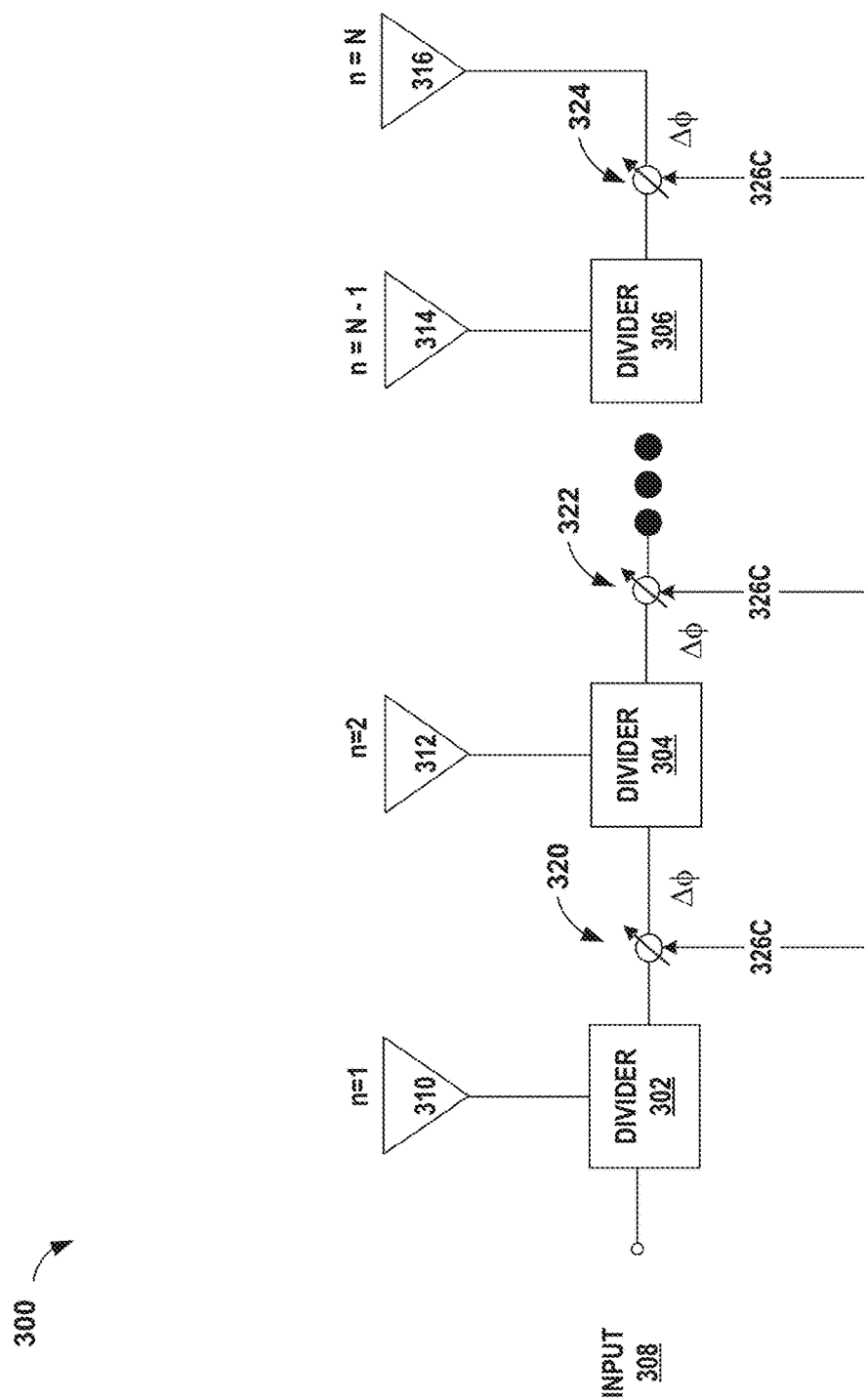
FIG. 3A is a block diagram illustrating an example generalized end-fed series array with varactor phase shifters between antenna elements.

FIG. 3A is a block diagram illustrating an example generalized end-fed series array with varactor phase shifters between antenna elements. Each of phase shifters 320, 322 and 324 are examples of phase shift circuits 100 and 200 described above in relation to FIGS. 1 and 2 and may have similar functions and characteristics. Phase shifters 320, 322 and 324 may receive control signals 326A, 326B and 326C to adjust the phase changes (Δϕ) of each phase shifter. Phase change (Δϕ) may also be referred to as the magnitude of phase shift for each phase shifter.

In the example of FIG. 3A, system 300 is a frequency modulated continuous wave (FMCW) transmit antenna array device configured as an end-fed series array of antenna elements connected by phase shifters. A first power divider 302 includes a first input terminal coupled to input 308, a first output terminal coupled to first antenna element 310 and a second output terminal coupled to phase shifter 320. Input terminal 308, in the example of a transmit antenna may receive RF energy from a feed network connected to transmitter circuitry of, for example, a radar device (not shown in FIG. 3A). In the example of a receive antenna, "input" terminal 308 may be considered an output terminal that couples received RF signals from antenna elements 310, 312, 314 and 316 to a feed network connected to receiver circuitry (not shown in FIG. 3A)

The example of system 300 includes N antenna elements and N−1 power dividers and phase shifters. Phase shifter 320 connects the second output terminal of power divider 302 to the input terminal of power divider 304. Antenna element 310 (n=1) connects to the first output terminal of power divider 302. Similarly, phase shifter 322 connects the second output terminal of power divider 304 to a next power divider input terminal along the antenna array of system 300 (not shown in FIG. 3A). Antenna element 312 (n=2) connects to the first output terminal of power divider 304. The first output of the last power divider 306 of system 300 is configured to output RF power to antenna element 314 (n=N−1) and outputs power to the last antenna element 316 (n=N) through a last phase shifter 324. An input terminal of power divider 306 may receive power via phase shifter, similar to phase shifters 320, 322 and 324 (not shown in FIG. 3A).

Power dividers 302, 304 and 306 may be any type of RF power divider configured to send some RF energy to a respective antenna element at the first output terminal and send the remaining RF energy to its second output terminal. Some examples of power dividers may include reactive power dividers, Wilkinson power dividers and other similar power dividers.

Figure 3B:
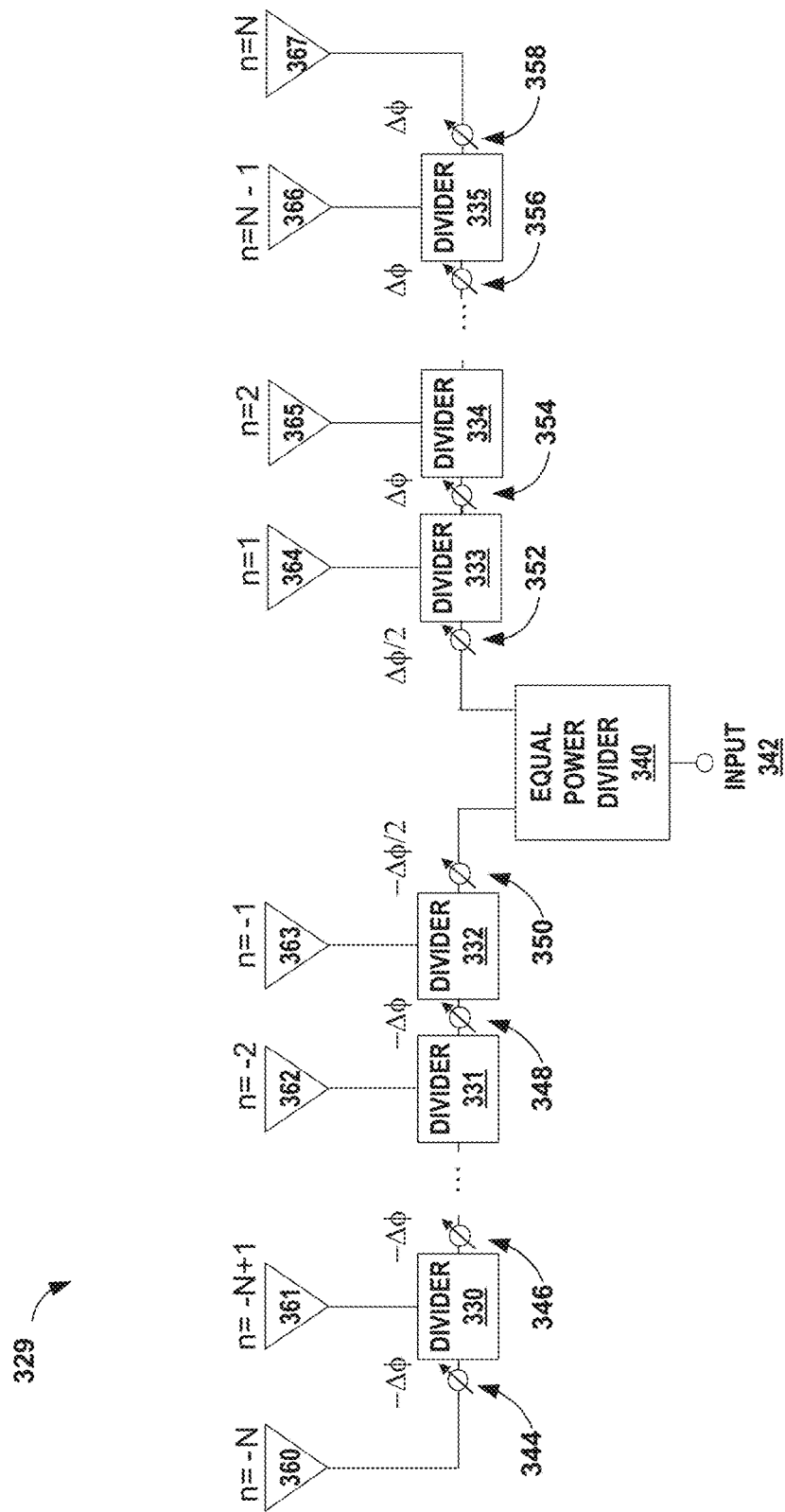
FIG. 3B is a block diagram illustrating an example generalized center-fed series array with varactor phase shifters between antenna elements.

FIG. 3B is a block diagram illustrating an example of a generalized center-fed series array with varactor phase shifters between antenna elements. System 329 is an example of system 300 described above in relation to FIG. 3 in which RF signals received by input terminal 342 first pass through equal power divider 340, but otherwise may have similar functions and characteristics. In the example of a receive antenna array, system 329 may output received signals from "input" terminal 342. Similarly, each of phase shifters 344-358 are examples of phase shift circuits 100 and 200 described above in relation to FIGS. 1 and 2 and may have similar functions and characteristics. Each of phase shifters 344-358 may receive control signals (not shown in FIG. 3B) to adjust the phase changes (e.g. Δϕ or Δϕ/2) of each phase shifter.

The example of FIG. 3B is similar to a pair of end-fed FMCW transmit antenna devices connected to equal power divider 340. The example of system 329 includes 2×N antenna elements and 2×N phase shifters. On the right side of FIG. 3B, phase shifter 354 connects the second output terminal of power divider 333 to the input terminal of power divider 334. Antenna element 364 (n=1) connects to the first output terminal of power divider 333. The input terminal of power divider 333 receives RF energy from equal power divider 340 through phase shifter 352. Phase shifters 352 and 350 may have the magnitude of phase set to half the phase shift (Δϕ/2) of the other phase shifters of system 329.

Similarly, the second output terminal of power divider 334 may connect through a phase shifter to a next power divider input terminal along the antenna array of system 329 (not shown in FIG. 3B). Antenna element 365 (n=2) connects to the first output terminal of power divider 334. The first output of the last power divider 335 of system 329 is configured to output RF power to antenna element 366 (n=N−1) and outputs power to the last antenna element 367 (n=N) through a last phase shifter 358. An input terminal of power divider 335 may receive power via phase shifter 356.

On the left side of FIG. 3B, phase shifter 348 connects the second output terminal of power divider 332 to the input terminal of power divider 331. The input terminal of power divider 332 receives RF energy from equal power divider 340 through phase shifter 350. The input terminal to power divider 332 receives a signal phase shifted by Δϕ/2 in the opposite direction from the phase shift of phase shifter 352, e.g. Δϕ/2. Antenna element 363 (n=−1) connects to the first output terminal of power divider 332. Similarly, the second output terminal of power divider 331 may connect to through a phase shifter to a next power divider input terminal along the antenna array of system 329 (not shown in FIG. 3B). Antenna element 362 (n=−2) connects to the first output terminal of power divider 331. The first output of the last power divider 330 on the left side of system 329 is configured to output RF power to antenna element 361 (n=−N+1) and outputs power to the last antenna element 360 (n=−N) through a last phase shifter 344. An input terminal of power divider 330 may receive power via phase shifter 346.

Figure 3C:
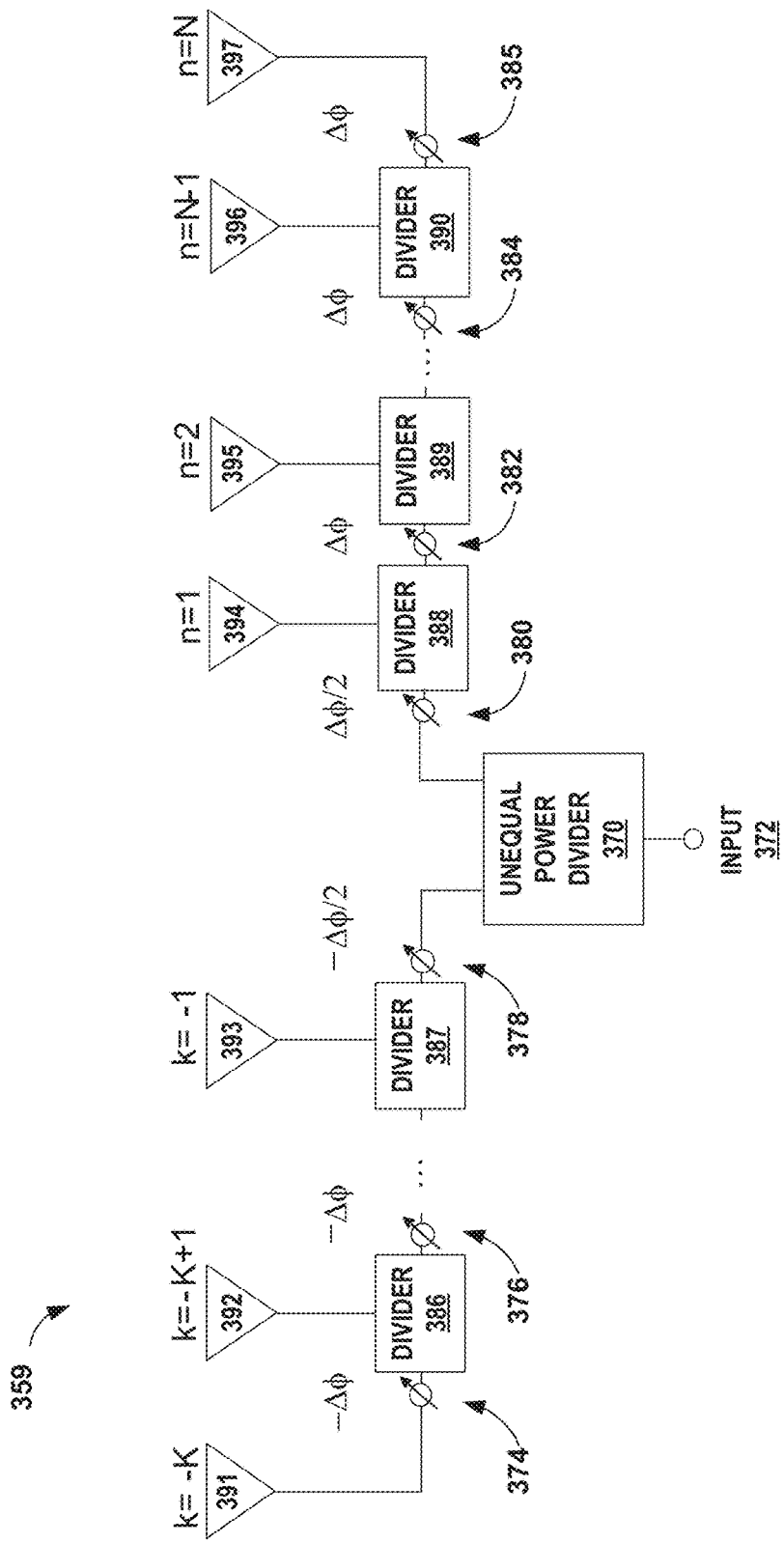
FIG. 3C is a block diagram illustrating an example generalized off-center-fed series array with varactor phase shifters between antenna elements.

FIG. 3C is a block diagram illustrating an example generalized off-center-fed series array with varactor phase shifters between antenna elements. System 359 is an example similar to systems 300 and 329 described above in relation to FIGS. 3A and 3B and may have similar functions and characteristics. The example of system 359 includes N+K antenna elements and N+K phase shifters, in which each phase shifter is an example of phase shifter circuits 100 and 200 described above in relation to FIGS. 1 and 2.

Similar to system 329, the example of FIG. 3B is like a pair of end-fed FMCW transmit antenna devices connected to unequal power divider 370. On the right side of FIG. 3C, phase shifter 380 connects the second output terminal of power divider 388 to the input terminal of power divider 389. Antenna element 394 (n=1) connects to the first output terminal of power divider 388. The input terminal of power divider 388 receives RF energy from unequal power divider 370 through phase shifter 380. Phase shifters 380 and 378 may have the magnitude of phase set to half the phase shift (Δϕ/2) of the other phase shifters of system 359.

The second output terminal of power divider 389 may connect through a phase shifter to a next power divider input terminal along the antenna array of system 359 (not shown in FIG. 3C). Antenna element 395 (n=2) connects to the first output terminal of power divider 389. The first output of the last power divider 390 of system 359 is configured to output RF power to antenna element 396 (n=N−1) and outputs power to the last antenna element 397 (n=N) through a last phase shifter 385. An input terminal of power divider 390 may receive power via phase shifter 384.

On the left side of FIG. 3C, the second output terminal of power divider 387 may connect to through a phase shifter to a next power divider input terminal along the antenna array of system 359 (not shown in FIG. 3C). The input terminal of power divider 387 receives RF energy from unequal power divider 370 through phase shifter 378. The input terminal to power divider 387 receives a signal phase shifted by $\Delta\phi/2$ in the opposite direction from the phase shift of phase shifter 380, e.g. $-\Delta\phi/2$. Antenna element 393 (k=−1) connects to the first output terminal of power divider 387. The first output of the last power divider 386 on the left side of system 359 is configured to output RF power to antenna element 392 (k=−K+1) and outputs power to the last antenna element 391 (k=−K) through a last phase shifter 374. An input terminal of power divider 386 may receive power via phase shifter 376.

Figure 3D:
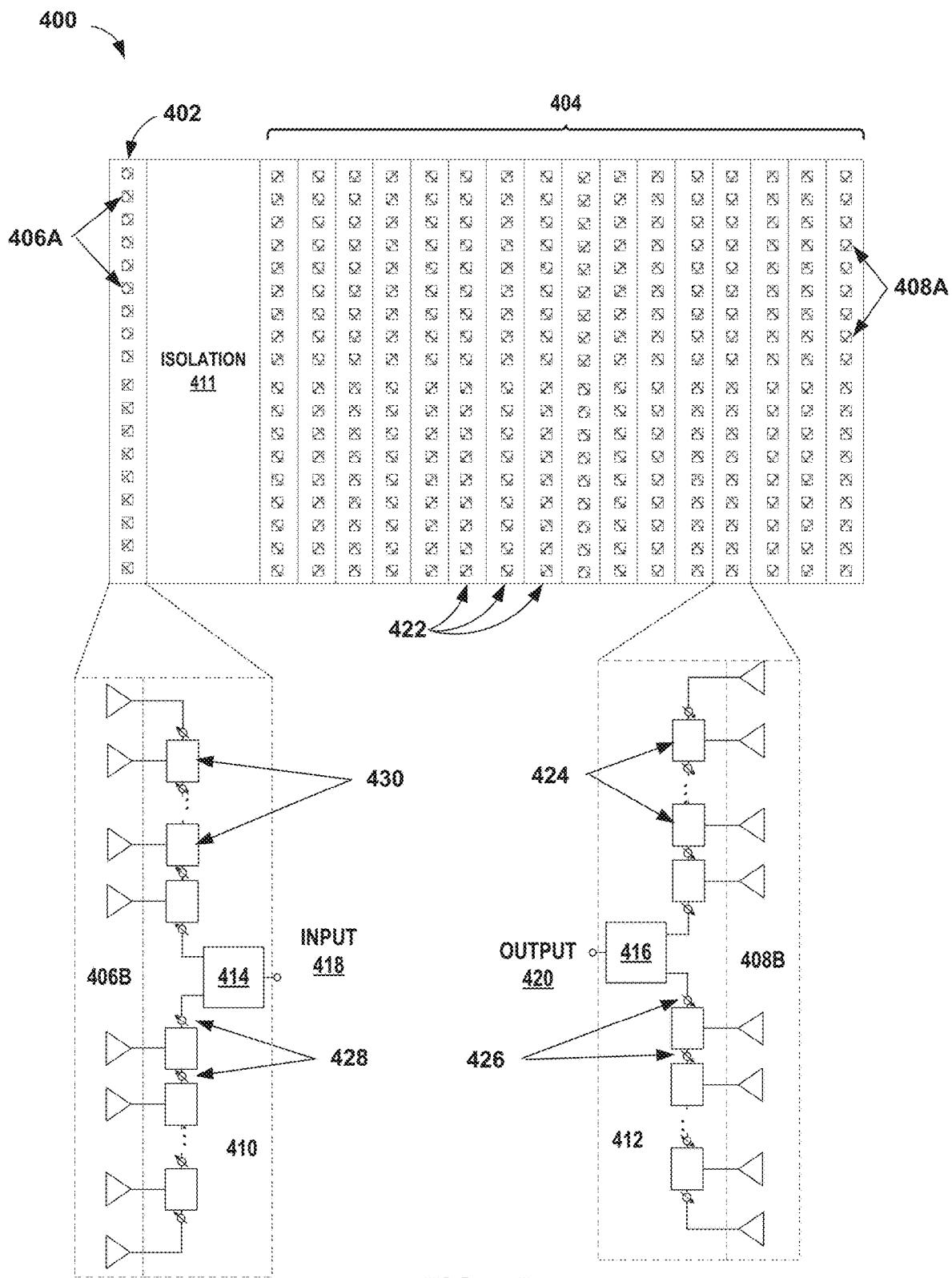
FIG. 3D is a conceptual diagram illustrating an example radar system including a transmit series array and a receive series array including varactor phase shifters between antenna elements.

FIG. 3D is a conceptual diagram illustrating an example radar system including a transmit series array and a receive array including varactor phase shifters between antenna elements. System 400 may be implemented as a multi-layer circuit board with a plurality of antenna elements on a radiation layer of the multi-layer circuit board. The radiation layer, as shown in FIG. 3D, may include a separate transmit antenna 402 and received antenna 404, each including an array of antenna elements.

Transmit antenna 402 may include transmit elements 406A and may be arranged to transmit a high aspect ratio transmit beam that is wider in first illumination direction than a second direction. In the example of FIG. 3D, the first illumination direction is perpendicular to the long axis of the column of antenna elements 406A of transmit antenna 402. In other words, the short axis of the transmit beam is parallel to the long axis of the column of antenna elements 406A. Phase shifters 428 between the antenna elements allow radar system 400 to scan the transmit beam along the short axis, in the second illumination direction.

Transmit antenna 410 may include power dividers 414 and 430 coupled to antenna elements 406B. Transmit antenna 410 corresponds to transmit antenna 402 and antenna elements 406A correspond to antenna elements 406B. Power dividers 414 and 430, as well as phase shifters 428 may be located on a different layer of the multi-layer circuit board from the antenna elements on the radiation layer. Power dividers 414 and 430 and phase shifters 428 are examples of the power dividers and phase shifters described above in relation to FIGS. 3A-3C. Input terminal 418 may receive RF signals from transmit circuitry of radar system 400, which may also be located on a separate layer of the multi-layer circuit board (not shown in FIG. 3D).

Receive array 404 may include multiple columns of series receive antenna arrays 412, which correspond to receive arrays 422 and antenna elements 408A correspond to antenna elements 408B. As with transmit antenna 410, receive arrays 412 and 422 are examples of systems 300, 329 and 359 described above in relation to FIGS. 3A-3C. Output terminal 420 may output reflected radar signals received by antenna elements 408B via power dividers 424 and 416 and send the collected signals to receiver circuitry via a feed network (not shown in FIG. 3D).

In some examples, an isolation region 411 may separate transmit antenna 402 from receive antenna 404. Isolation region 411 may be implemented by a variety of techniques.

In operation, the receiver circuitry, on a separate layer of the multi-layer circuit board, may control the elevation "look angle" of the receive electronics at a radio frequency (RF) to coordinate the look angle with the elevation scan angle of the transmit beam. The radar receiver circuitry may further digitally form monopulse receive beams at the intermediate frequency (IF) within the processing circuitry of the receiver electronics and digitally scan the monopulse receive beams along the long axis of the field of view.

Figure 3E:
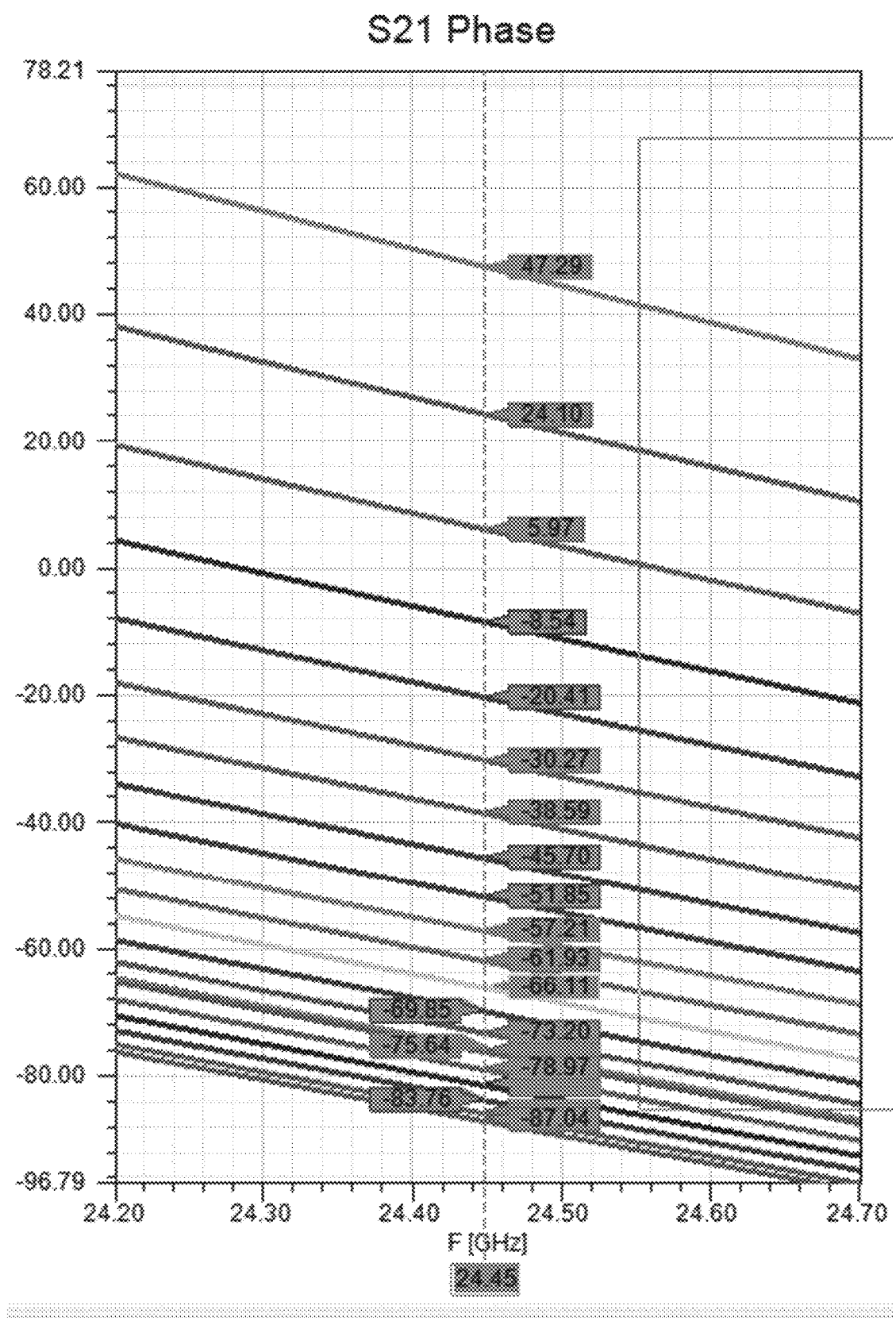
FIG. 3E is a graph illustrating an example S21 phase changes over the tuning range for a radar system according to one or more techniques of this disclosure.

FIG. 3E is a graph illustrating an example S21 phase changes over the tuning range for a radar system according to one or more techniques of this disclosure. The S21 graph may be applied to an antenna system such as radar system 400, described above in relation to FIG. 3D.

S-parameters may describe the input-output relationship between ports (or terminals) in an electrical system. For instance, for a two-port system then S12 may represent the power transferred from Port 2 to Port 1. S21 represents the power transferred from Port 1 to Port 2. In some examples, S-parameters may be a function of frequency and therefore may vary with frequency.

Figure 3F:
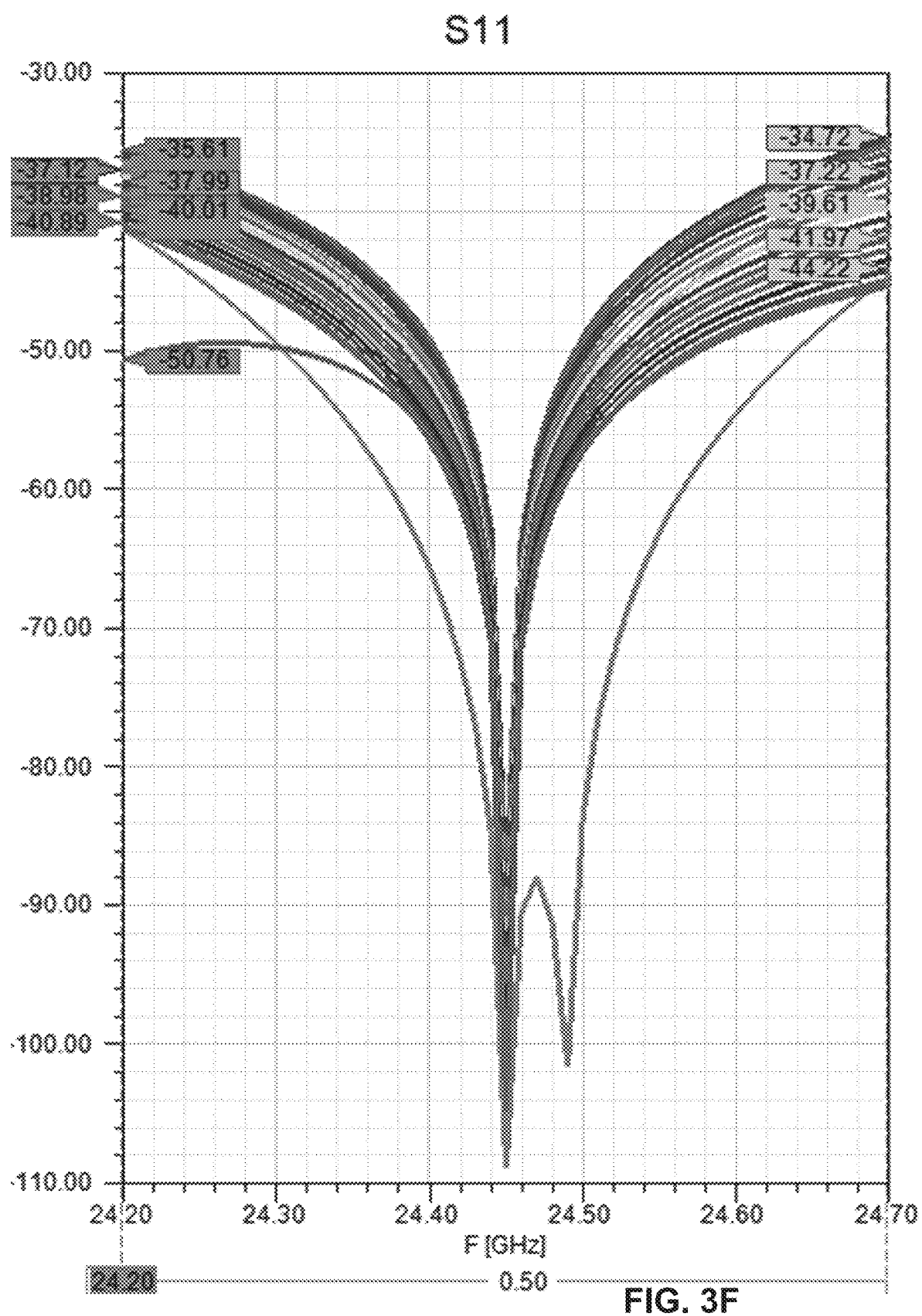
FIG. 3F is a graph illustrating an example S11 return loss over tuning range for a radar system according to one or more techniques of this disclosure.

FIG. 3F is a graph illustrating an example S11 return loss over tuning range for a radar system according to one or more techniques of this disclosure. S11 may represent how much power is reflected from the antenna and may be referred to as the reflection coefficient (e.g. gamma, Γ) or return loss. In other words, for a two-port system, S11 may be the reflected power the transmit circuitry tries to deliver to the antenna.

Figure 4:
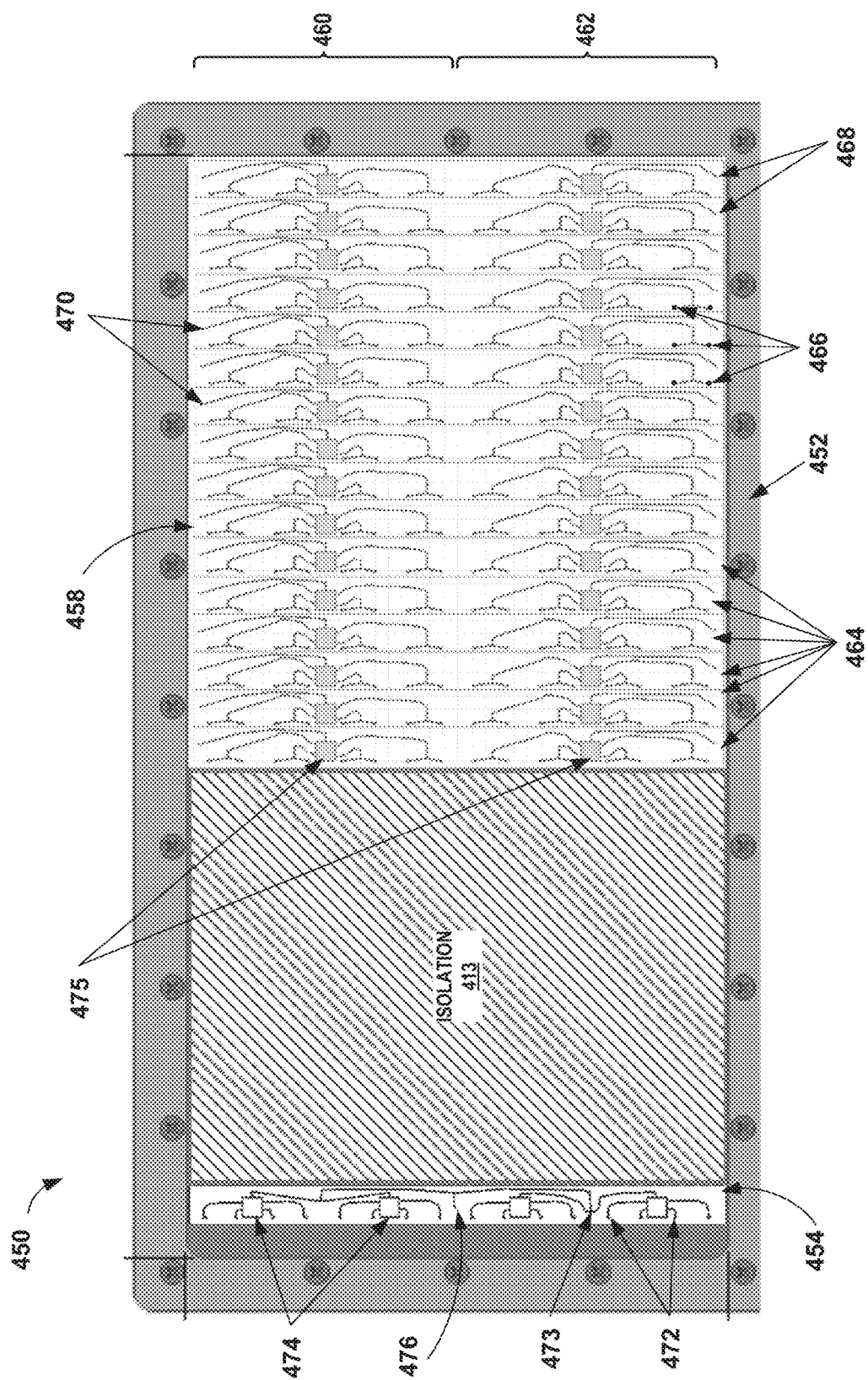
FIG. 4 is a conceptual diagram illustrating a back side of an antenna for a radar system including a feed distribution system for both the transmit and receive antennae, according to one or more techniques of this disclosure.

FIG. 4 is a conceptual diagram illustrating a back side of an antenna for a radar system including a feed distribution system for both the transmit and receive antennae, according to one or more techniques of this disclosure. The feed distribution system of system 450 may connect to the radiation layer including transmit antenna elements 406A and receive antenna elements 408A described above for system 400 in relation to FIG. 3D. The feed distribution system of system 450 may be on a separate layer of a multi-layer circuit board from the radiation layer and supported by housing 452. However, in contrast to the varactor phase shifters (e.g. 426 and 430) and power dividers (e.g. 424 and 430) depicted in FIG. 3D, the feed network of system 450 includes multi-channel control devices configured to individually adjust the phase and adjust the amplitude of the signal through each respective channel. By controlling the phase and/or amplitude of each channel, system 450 may scan a transmit beam and receive aperture along the short axis of the radar beam using RF beamforming techniques. As described above in relation to FIG. 3D, the receive feed system 458 of system 450 may couple received radar signals to receiver circuitry (not shown in FIG. 4). The radar receiver circuitry may further digitally form monopulse receive beams at the intermediate frequency (IF) within the processing circuitry of the receiver circuitry electronics and digitally scan the monopulse receive beams along the long axis of the field of view.

In the example of FIG. 4, system 450 includes a transmit feed network 454 for a transmit antenna that is separate from the receive feed network 458 for the receive antenna. Isolation region 413 may separate the transmit side from the receive side, similar to isolation region 411 described above in relation to FIG. 3D.

Transmit feed network 454 may include multi-channel control devices 474 that receive transmit RF signals from transmitter circuitry (not shown in FIG. 4) via input port 476. The transmit RF signals may pass through a power divider, e.g. power divider 473 and to an input element on each multi-channel control device 474.

In some examples, multi-channel control devices 474, which are the same as the multi-channel control devices 475 in the receive feed network, may be implemented as a multi-mode integrated circuit (MMIC), which includes both analog and digital circuits. To simplify the description, multi-channel control devices 474 and 475 may be referred to as MMIC 474 and 475, though in other examples the multi-channel control devices may be implemented using techniques other than an MIMIC. MIMIC 474 and MMIC 475 may be configured to receive a control signal (not shown in FIG. 4) to individually control the phase and the amplitude of the RF signal received.

In the example of transmit feed network 454, includes four MMICs 474 and each MIMIC 474 has four output elements 472. Each output element 472 may be coupled to an antenna element on the radiation layer (not shown in FIG. 4). Each MIMIC 474 may receive the RF transmit signal, and based on the control signal, individually adjust the phase and amplitude of the RF signal sent to the antenna element via each output element 472. System 450 may steer the transmit beam along the short axis of the transmit beam using RF beamforming techniques by changing the phase of each antenna element, similar the arrangement of phase shifters using varactor diodes described above in relation to FIG. 1.

Receive feed network 458 may be arranged as a set of receiver array columns 464 which have an upper half 460 and lower half 462. In the example of FIG. 4, each column 464 includes two MMICs 475. Similar to MIMIC 474, each MMIC 475 includes four input elements and one output element. Each of the four input elements may be coupled to two antenna elements (not shown in FIG. 4) on the radiation side of the multi-layer circuit board that includes receive feed network 458. Each input element may couple to the two antenna elements at 466. Each pair of receive antenna elements may couple reflected radar signals to the input element of each MMIC 475. Each MIMIC 475 may individually adjust the phase and amplitude of the received radar signals at each input element. Each MIMIC 475 may output the adjusted radar signals to receiver circuitry (not shown in FIG. 4) via output elements 468 and 470.

In contrast to other types of phased array radar systems, system 450 includes multi-channel control devices for the transmit antenna that are separate from the multi-channel control devices for the receive antenna. Other types of phased array antenna may use a different arrangement in which the same antenna elements are used for both transmit and receive and the same multi-channel control devices are used for both transmit and receive. However, the FMCW radar system 450 uses a separate transmit array to continuously output a wide transmit beam that is scanned along the short axis using RF beamforming techniques. The receive array of system 450 may synchronize the RF receive beam to also scan along the short axis using RF beamforming. In some examples, such as with system 450 oriented as shown in FIG. 4, the long axis of the wide transmit beam is oriented with the horizon. Therefore, system 450 may scan the wide beam in elevation (e.g. along the short axis) using RF beamforming. Receiver circuitry (not shown in FIG. 4) coupled to receive feed network 458 may downconvert the received radar signals to an intermediate frequency and digitally form monopulse receive beams, within the receiver signal processing circuitry, to scan in azimuth (e.g. along the long axis, perpendicular to elevation). In some examples, the intermediate frequency may be in the ultrasound frequency range, e.g. approximately 16 MHz. Using an intermediate frequency in the ultrasound frequency range may allow the use of off-the-shelf ultrasound signal processing circuit components, which may reduce the cost and complexity of a radar device that includes an antenna system such as system 450, or system 400 described above in relation to FIG. 3D.

In some examples, system 450 may also adjust the amplitude of each antenna element. The phase adjustment between antenna elements is how system 450 may focus and steer the RF receive beam in the elevation plane (short axis). The amplitude adjustment may be used to calibrate from one device to the next as well as apply an antenna taper, to reduce energy in the side lobes (such as a Taylor taper for example). In some examples, the radar system may use the amplitude adjustment for selecting different tapers. For example, the system may apply an aggressive taper to cause with low sidelobes for imaging and for close range targets. Applying a taper to the transmit beam may limit the gain and range. In other examples, the radar system may apply little or no taper for maximum main beam gain for long range targets, especially in a low clutter environment like air to air detections.

In the azimuth plane (long axis) system 450 may scan the receiver at the lower IF frequency using a phase shifter within the signal processing of the receiver circuitry. In some examples, system 450 may use the phase adjustments between columns 464 of receive feed network 458 to steer the RF receive beam in both in elevation and in azimuth on receive. However, performing azimuth steering within the receiver circuitry at the intermediate frequency may provide an advantage in avoiding calibration of both the short axis and long axis planes.

The arrangement of system 450 may provide advantages over other types of phased array radar systems. By using two antenna elements per input element for each MIMIC 475 in the receive array reduces the number of MMIC devices. By reducing the number of MMIC devices, system 450 may reduce cost, power and size when compared to other types of phased array radar systems. The reason system 450 may use only two elements per multi-channel control device on the receiver side, is because transmitter feed network 454 has a single MMIC output element per transmit antenna element. Because the transmit antenna array is arranged in a single column, the transmit antenna array has fewer antenna elements when compared to the multiple columns in the receive array. Because the transmitter has fewer antenna elements, the transmitter needs fewer multi-channel control devices. By implementing the transmit antenna with a single MMIC output element per antenna element, the transmitter may have fewer sidelobes in the transmit antenna pattern. In this manner, the combination of transmit and receive antenna pattern for system 450 results in side lobe levels that provide the desired performance and the benefit of reduced cost and power consumption by reducing the number of multi-channel control devices, when compared to other types of phased array systems. Also, system 450 may be more expensive than the varactor phase shifter circuits described above in relation to FIGS. 1-3D. However, system 450 may have improved performance because of reduced loss and improved noise figure when compared to the varactor phase shifter arrangements of systems 300, 329, 359 and 400.

In the examples of system 450, and of system 400 described above in relation to FIG. 3D, the radar systems steer the RF receive beam with at RF by changing the phase of the antenna elements in the example of system 400 or the phase and/or amplitude in the example of system 450. In this example of operation, systems 400 and 450 operate fundamentally different from a multiple-input multiple-output (MIMO) radar system, such as radar systems that may be used in vehicles like an automobile. A MIMO radar system is a type of phased array radar employing digital receivers and waveform generators distributed across the aperture. During MIMO operation, all the energy may be received at the receive array. The signal processing in the receiver circuitry may perform time of arrival calculations for each element to determines the direction of the reflected radar signals. In some examples however, systems 400 and 450 may also function in a MIMO mode of operation. Instead of digitally forming receive beams to scan in azimuth at the intermediate frequency, the radar systems of this disclosure may sample each receive element and use MIMO techniques to estimate the azimuth angle of the target.

Figures 5A, 5B:
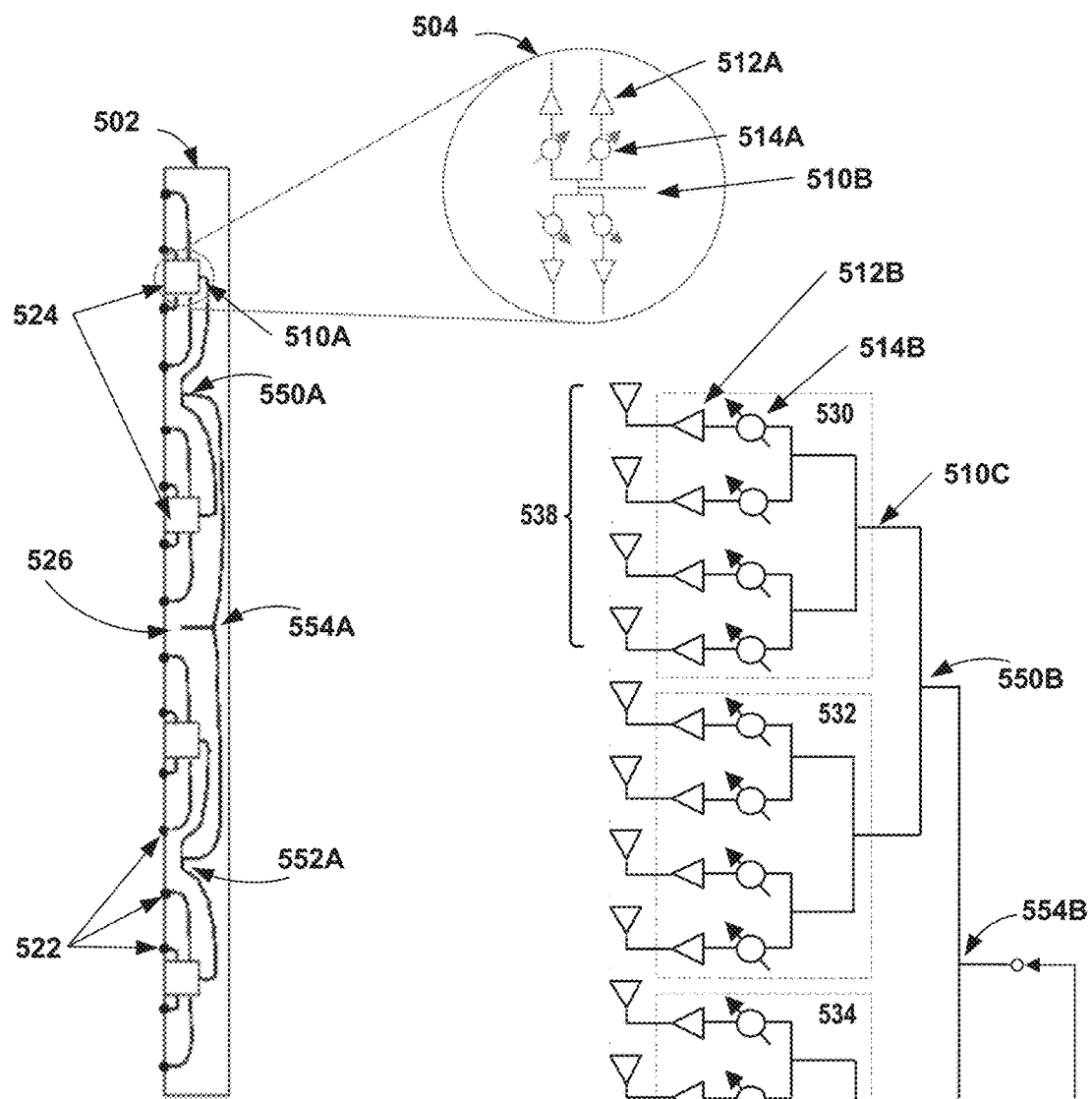
FIGS. 5A and 5B illustrate an example implementation of a one-dimensional phased array transmit antenna for scanning in elevation with amplitude and phase control at each element, according to one or more techniques of this disclosure.

FIGS. 5A and 5B illustrate an example implementation of a one-dimensional phased array transmit antenna and feed network for scanning in elevation with amplitude and phase control at each element, according to one or more techniques of this disclosure. Feed network 502 in FIG. 5A is an example of transmit feed network 454 and may have the same functions and characteristics.

As described above in relation to FIG. 4, transmit feed network 502 may include multi-channel control devices 524 that receive transmit RF signals from transmitter circuitry (e.g. transmitter circuitry 560 depicted in FIG. 5B) via input port 526. The transmit RF signals may pass through a power dividers 554A, 550A and 552A and to an input element, e.g. 510A, on each multi-channel control device 524. To simplify the description, multi-channel control devices 524, as well as 530, 532, 534 and 536 in FIG. 5B may be referred to as "MMIC."

In the example of transmit feed network 502, includes four MMICs 524 and each MIMIC 524 has four output elements 522. Each output element 522 may be coupled to an antenna element on the radiation layer (not shown in FIG. 5B) of a multi-layer circuit board. Each MIMIC 524 may receive the RF transmit signal and based on a control signal (not shown in FIG. 5B), individually adjust the phase and amplitude of the RF signal sent to the antenna element via each output element 522. A radar system including transmit feed network 502 may steer the transmit beam along the short axis of the transmit beam using RF beamforming techniques by changing the phase of each antenna element.

FIG. 5A includes a schematic diagram 504 of an example arrangement within each MMIC 524. Each MIMIC 524 may include an input element 510B. An RF signal received at input element 510B may pass through a phase shifter, e.g. phase shifter 514A, and an amplifier, e.g. amplifier 512A, before reaching an output element 522.

FIG. 5B illustrates an example schematic diagram of a transmit feed network, such as transmit feed network 502. Transmitter circuitry 560 may output control signals 564 to MMICs 530, 532, 534 and 536 to individually control the phase and amplitude for each channel, e.g. control phase shifter 514B and amplifier 512B.

Power dividers 530-536 may also receive an RF transmit signal 562 via power dividers 554B, 550B and 552B. Each power divider may receive the RF transmit signal at an input element, such as input element 510C.

As described above in relation to FIG. 4, each respective output channel may be connected to a respective antenna element, such as antenna elements 538, on the radiation layer of the multi-layer circuit board. In some examples, each respective output channel may connect to a respective antenna element at an output terminal, e.g. terminal 522 depicted in FIG. 5A. In the example of FIGS. 5A and 5B, the output of the amplitude control circuit, e.g. amplifier 512A and 512B, may connect to the output terminal and to a respective antenna element 538. However, in other examples, the phase control circuit, e.g. phase shifter 514A and 514B, may connect to the amplitude control circuit such that the RF transmit signal 562 passes through the phase shifter and the amplifier in either order. The respective phase control circuit and amplitude control circuit may be configured to adjust an amplitude and phase of the transmit signal for each respective output channel independently from any other output channel.

FIGS. 6A and 6B illustrate an example implementation of one column of a multi-column phased array receive antenna for scanning in elevation with amplitude and phase control at each element, according to one or more techniques of this disclosure. The receive feed network column depicted in FIGS. 6A and 6B is an example of any of columns 464 described above in relation to FIG. 4.

In the example of FIGS. 6A and 6B, the receive feed network may be arranged as one of a set of receiver array columns which have an upper half 610 and 638 and lower half 612 and 640. In the example of FIGS. 6A and 6B, each column includes two MMICs such as MMIC 602 and 604 and in FIG. 6B, MMIC 630 and 632. Similar to MMIC 475, described above in relation to FIG. 4, each MMIC includes four input elements and one output element. Each of the four input elements may be coupled to two respective antenna elements, such as antenna elements 638 and 640. For example, input element 615 couples to a first antenna element and a second antenna element of antenna elements 638. Each pair of receive antenna elements may couple reflected radar signals to the input element of each receive MMIC. Each receive MMIC may individually adjust the phase and amplitude of the received radar signals at each input element. For example, MMIC 630 may adjust the amplitude, with amplifier 612A and the phase, with phase shifter 614B of radar signals received at input element 615. Each MMIC 475 may output the adjusted radar signals to receiver circuitry, such as receiver circuitry 660, via output elements 610A, 610B, 610C, 618 and 620.

In some examples, receiver circuitry 660 may output control signals 664 to control the phase control circuits and amplitude control circuits of, for example MMIC 632. In other examples, other processing circuitry of a radar system (not shown in FIG. 6B) may output control signals 664.

As described above in relation to FIG. 4, a receive antenna according to this disclosure may include several columns of receive antenna elements coupled to receive feed network columns. Each channel of each respective multi-channel control device, e.g. MMIC 632, may be configured to receive reflected transmit signals from a respective pair of receive antenna elements.

The arrangement of the receive antenna of this disclosure, as shown in FIGS. 6B and FIG. 4, may provide advantages when compared to other radar systems. By combining two receive elements into one phase shifter may significantly reduce the number of phase shifters and therefore reduce cost and complexity of the receive antenna. The resulting receive beam is still steerable and provides good performance for the radar system of this disclosure with the short aspect ratio transmitter beam. The transmit antenna, e.g. as shown in FIGS. 4, 5A and 5B includes a phase shifter for each element. Because the transmit antenna has fewer elements when compared to the receive antenna array, the cost/complexity of providing a separate phase shifter for each transmit element to provide higher performance and reduced sidelobes is less than attempting to provide a separate phase shifter for each receive element. Thus, the combined transmit and receive antenna arrays provide good performance while managing the degree of cost and complexity.

Figure 7A:
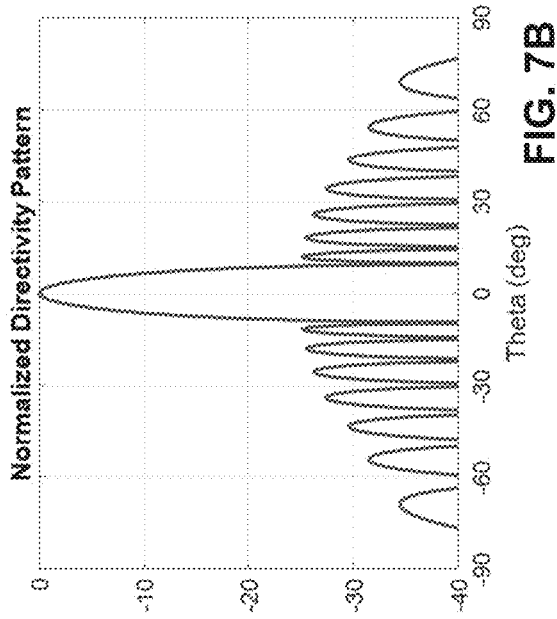
FIGS. 7A, 7B, and 7C illustrate an examples of normalized antenna array elevation pattern cuts for broadside for a 0° scan for a radar antenna system according to one or more techniques of this disclosure.
Figure 7B:
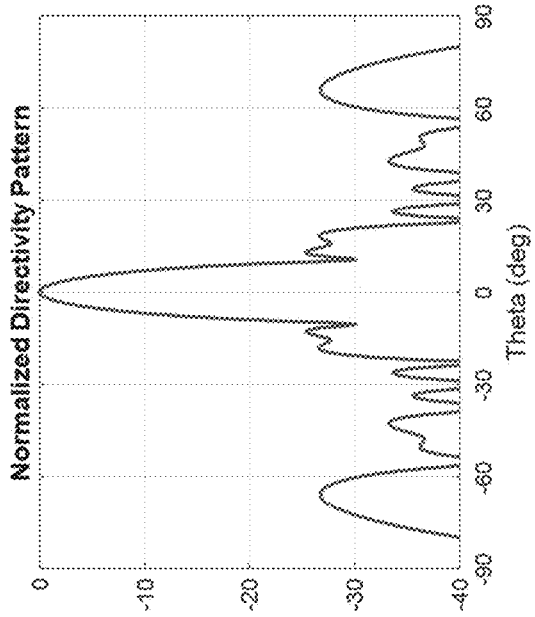
Figure 7C:
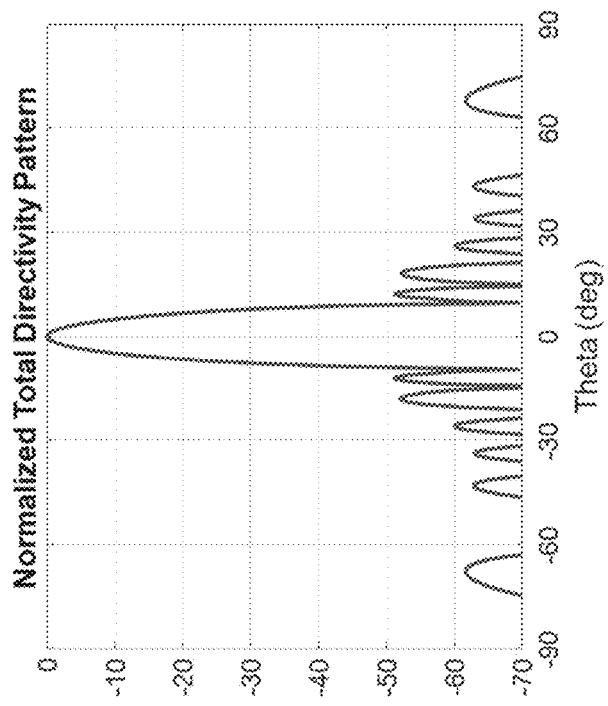

FIGS. 7A, 7B and 7C illustrate an example of a normalized antenna array elevation pattern cuts for broadside scan, e.g. 0° scan, for a radar antenna system according to one or more techniques of this disclosure. FIG. 7A illustrates an example receive array pattern, where theta, along the X-axis is the angle off the centerline along the short axis of the antenna beam. FIG. 7B illustrates an example transmit array pattern. FIG. 7C illustrates an example combined radar pattern from multiplying the receive and transmit patterns.

Figure 8A:
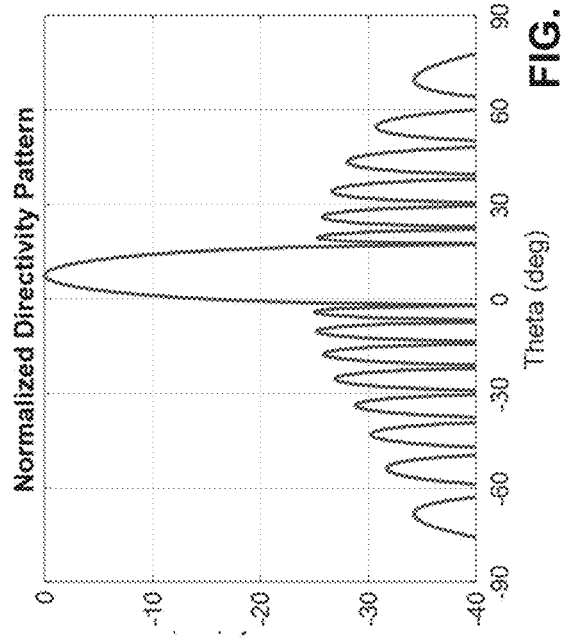
FIGS. 8A, 8B, and 8C illustrate examples of normalized antenna array elevation pattern cuts for a 7.5° scan angle of a radar antenna system according to one or more techniques of this disclosure.
Figure 8B:
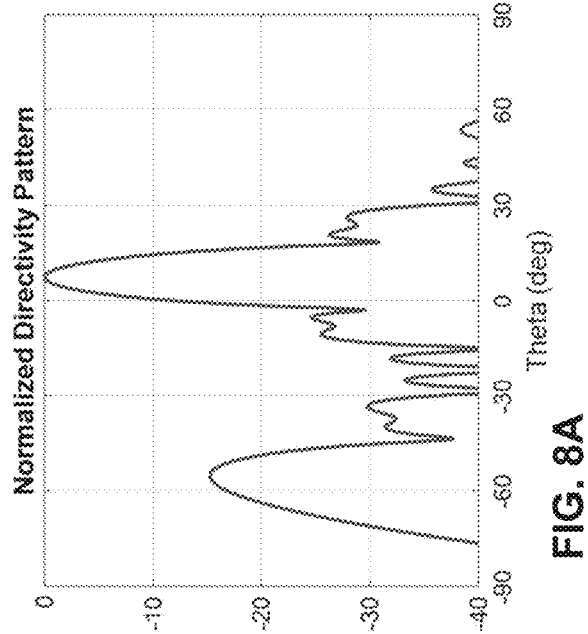
Figure 8C:
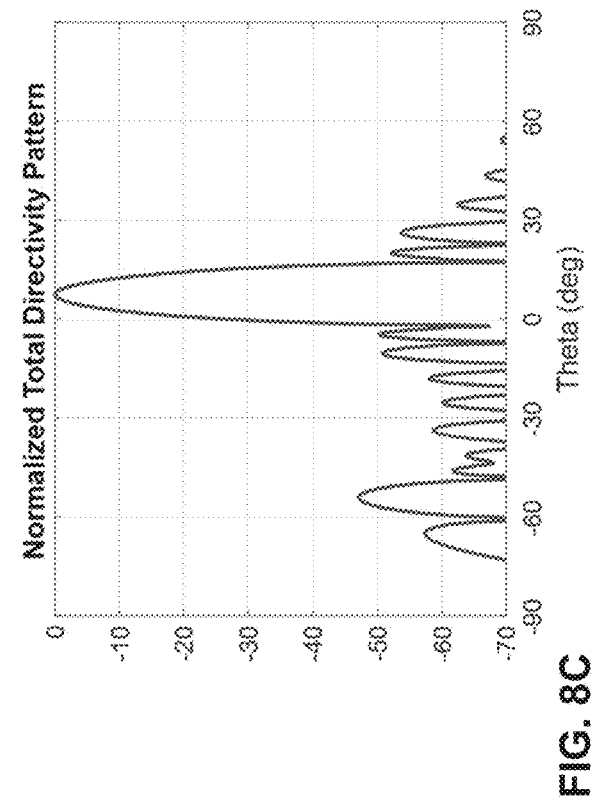

FIGS. 8A, 8B and 8C illustrate an example of a normalized antenna array elevation pattern cuts for a 7.5° scan angle of a radar antenna system according to one or more techniques of this disclosure. In other words, the radar system adjusts the phase of each channel such that the RF receive beam and the transmit beam are directed to a 7.5° scan angle along the short axis. In the orientation depicted for examples of system 400 and 450, the 7.5° scan angle is in elevation. FIG. 8A illustrates an example receive array pattern, where theta, along the X-axis is the angle off the centerline along the short axis of the antenna beam. FIG. 8B illustrates an example transmit array pattern. FIG. 8C illustrates an example combined radar pattern from multiplying the receive and transmit patterns.

FIGS. 9A, 9B and 9C illustrate an example of a normalized antenna array elevation pattern cuts for a 15° scan angle of a radar antenna system according to one or more techniques of this disclosure. FIG. 9A illustrates an example receive array pattern, where theta, along the X-axis is the angle off the centerline along the short axis of the antenna beam. FIG. 9B illustrates an example transmit array pattern. FIG. 9C illustrates an example combined radar pattern from multiplying the receive and transmit patterns.

Figure 10:
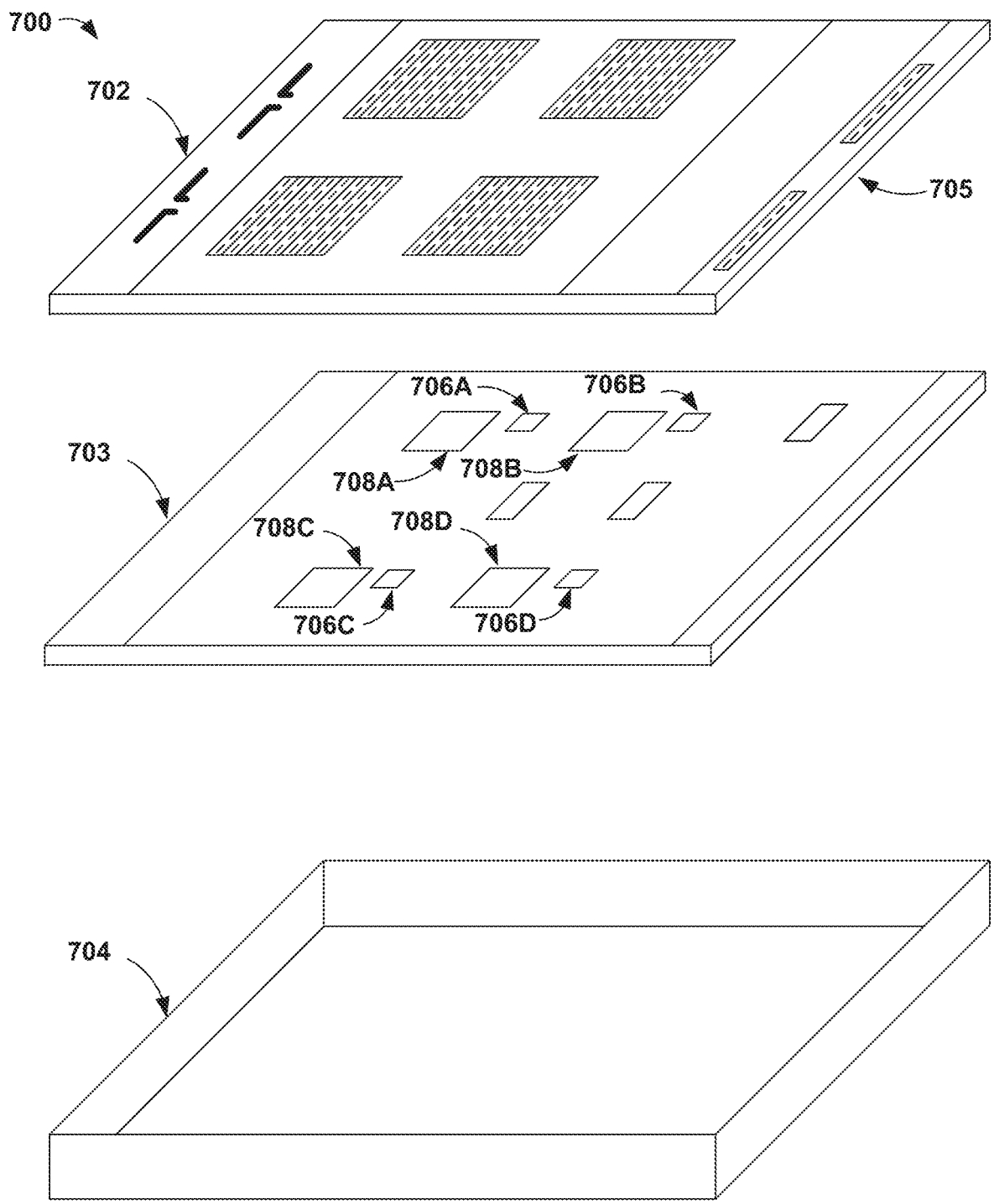
FIG. 10 is a conceptual diagram illustrating an exploded view of an example integrated radar system including a multi-layer circuit board in accordance with one or more techniques of this disclosure.

FIG. 10 is a conceptual diagram illustrating an exploded view of an example integrated radar system including a multi-layer circuit board in accordance with one or more techniques of this disclosure. FIG. 10 illustrates an example radar system which may include antenna systems such as systems 400 and 450 described above in relation to FIGS. 3D and 4. In the example of FIG. 10, the integrated radar system is implemented as a multi-layer printed circuit board (PCB) 701 that may include antenna layer 702 and one or more circuit layers 703. Antenna layer 702 may include a radiation layer and feed network layer 705 (not visible in FIG. 10). Circuit layers 703 may include receiver circuitry, such as receiver circuits 708A-708D, analog-to-digital (A/D) converters 706A-706D as well as other circuit elements. An analog-to-digital converter may also be called an "ADC."

Multi-layer PCB 701 may include circuits and components that implement radar transmitter electronics, radar receiver electronics, one or more processors, communication electronics, power conditioning and distribution, clock/timers and other circuitry and components. The one or more processors may be configured to control the radar transmitter electronics and radar receiver electronics as well as process and identify radar targets and send notifications and information to users using the communication electronics. A processor may include, any one or more of a microprocessor, a controller, a digital signal processor (DSP), an application specific integrated circuit (ASIC), a field-programmable gate array (FPGA), a system on chip (SoC) or equivalent discrete or integrated logic circuitry. A processor may be integrated circuitry, i.e., integrated processing circuitry, and that the integrated processing circuitry may be realized as fixed hardware processing circuitry, programmable processing circuitry and/or a combination of both fixed and programmable processing circuitry.

Antenna layer 702 may be electrically connected to circuit paths and components on one or more circuit layers 703 via transmitter and receiver feed networks as described above in relation to FIGS. 1-3D and 4-6B. In some examples, plated vias may provide connections between one or more circuit layers 703, as well as to antenna layer 702. A via may be a plated or un-plated hole that may be drilled, etched, or otherwise formed between layers of multi-layer PCB 701. A plated via may be plated with a conductive material to electrically connect layers. Some examples of conductive material may include copper, solder, conductive epoxy, or other materials.

Protective shield 704 may cover and provide structural support for example integrated radar system 700. Protective shield 704 may be a molded plastic, stamped or formed sheet metal or other suitable material. Protective shield 704 may include a conductive coating in one or more areas to provide shielding for electromagnetic interference (EMI). Protective shield 704 may include penetrations for power, communication or other connections as well as be configured to securely mount integrated radar system 700. Though depicted as rectangular in the example of FIG. 10, the multi-layer circuit board, and protective shield 704, may be any shape, including round, oval, octagonal, and so on.

In operation, integrated radar system 700 may provide digital electronic beam steering on received radar reflections by using, in part, phase shift commands within the components on one or more circuit layers 703 and feed network layer 703. The radar transmitter electronics, in signal communication with the radar transmit antenna, are configured to output, e.g., transmit, monopulse radar signals in wide beam transmit beam. The radar receiver electronics in signal communication with the radar receive antenna search the reflected radar signals by a "pencil beam" monopulse receive pattern that scans within the illuminated transmit area. In other words, integrated radar system 700, in this example, is a frequency modulated continuous wave radar system with a separate transmit antenna and receive antenna. The FMCW radar signals provide very fine range resolution and allows very low receiver bandwidth and low data rates. This includes resolution in all three dimensions. In other words, integrated radar system 700 may locate the X, Y and Z position of possible collision threats. The digital electronic beam steering at baseband frequencies may provide the advantage of reduced cost and complexity because of fewer radio frequency (RF) components.

In one example, radar system 700 may use a heterodyne FMCW radar with a 16 MHz first intermediate frequency (IF) before down conversion to a baseband between 1 KHz and 2 MHz. Integrated radar system 700 may apply the 16 MHz offset using a dual direct digital synthesis (DDS) at the transmit array. A heterodyne system may provide advantages over other FMCW radars that use a homodyne receiver to directly convert RF signals to baseband near zero frequency. Integrated radar system 700 may include components with a passband that includes 16 MHz. These components may also provide simultaneous down conversion to base band, I/Q channel formation and four-bit phase shift. By using multifunction components along with frequency down conversion, radar system 700 may provide advantages over a standard homodyne receiver, even if the homodyne receiver used an I/Q mixer on receive. In this way, integrated radar system 700 may achieve performance advantages. A few examples of performance advantages may include I/Q accuracy (true 90 degree offset), four-bit phase shift, fine range and elevation resolution, low receiver bandwidth, low data rates, small size, light weight, low power consumption, integrated package and easy retrofit of existing platforms.

Figure 11:
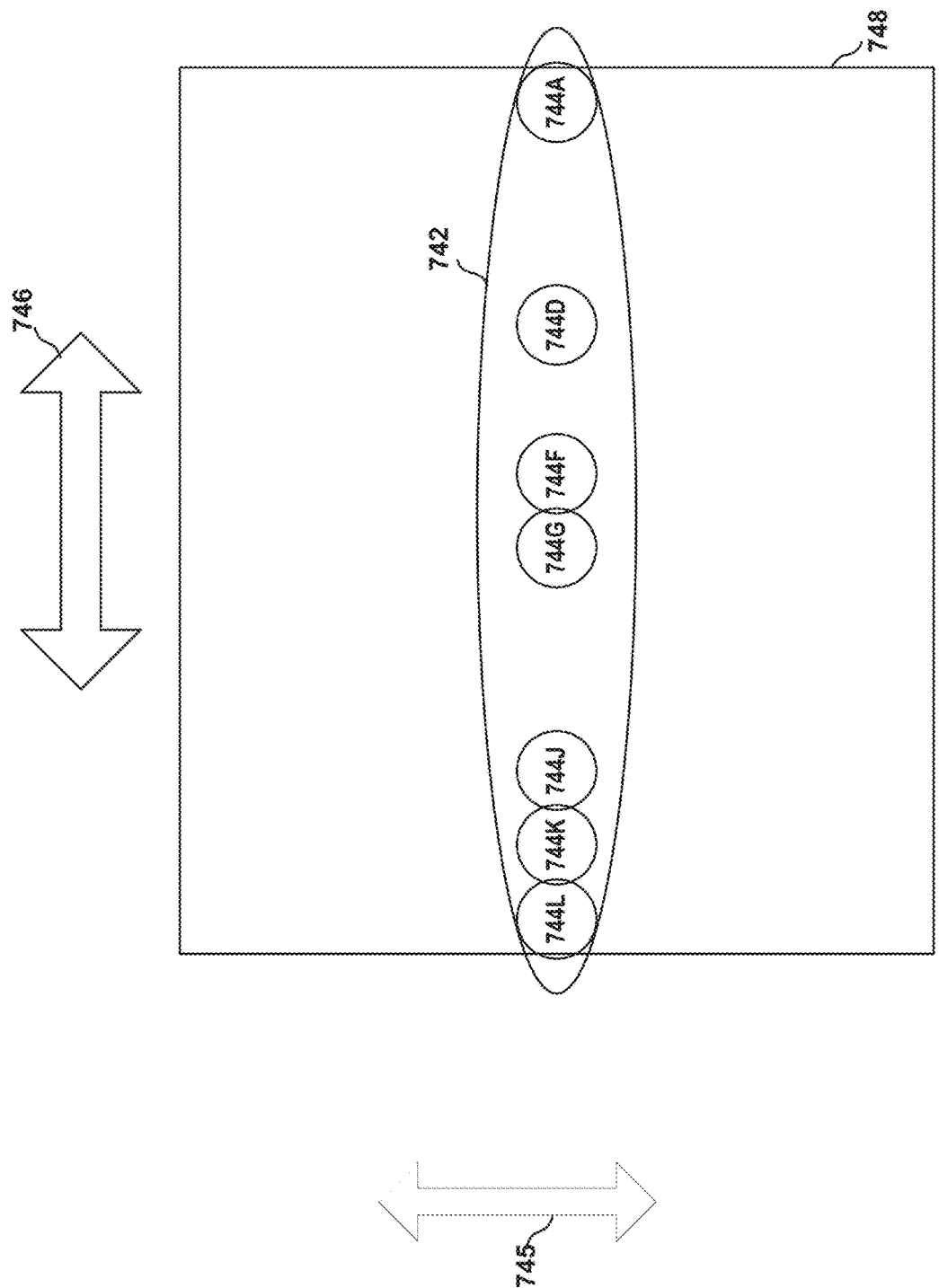
FIG. 11 is a conceptual diagram illustrating an example transmit beam and receive beams of a radar system in accordance with one or more techniques of this disclosure.

FIG. 11 is a conceptual diagram illustrating an example transmit and receive beam of a radar system in accordance with one or more techniques of this disclosure. The example FIG. 11 is oriented to correspond with the example of systems 400 and 450 described above in relation to FIGS. 3D and 4. In other words, the long axis of transmit beam 742 is oriented along the horizon, in first illumination direction 746 and may be scanned along the short axis in the second illumination direction 745. As described above in relation to FIG. 3D, the first illumination direction 746 is perpendicular to the long axis of the column of antenna elements 406A of transmit antenna 402.

Transmit beam 742 of FIG. 11 may be an FMCW radar transmit beam that illuminates an area with a greater extent in a first illumination direction 746 (e.g., in azimuth) than in a second illumination direction 745 (e.g., in elevation). The second illumination direction 745 is substantially perpendicular to the first illumination direction 746. In other words, transmit beam 742 is a high-aspect ratio transmit beam that covers an area of interest (AOI) 748 or field of regard. In some examples, the beamwidth of transmit beam 742 in the first illumination direction 746 is greater than 65 degrees and less than eight degrees in the second illumination direction 745.

An RF receive beam, which may be a similar size and shape to transmit beam 742 may be scanned to synchronize with the area illuminated by transmit beam 742. As described above in relation to FIGS. 3D and 4, receiver circuitry may digitally form monopulse receive beams within signal processing circuitry to scan along the first illumination direction 746, e.g. in azimuth. In the example of FIG. 11, receiver circuitry (not shown in FIG. 11) may form one or more monopulse receive beams, using digital beam forming, such as receive beams 744A, 744D, 744F, 744G, 744J, 744K and 744L, which as a group may be referred to as receive beams 744. In some examples, the receive aperture of the radar system of this disclosure is a symmetric aperture, e.g. a circular aperture as shown by receive beams 744.

In some examples, signal processing circuitry the radar system may use the one or more digitally formed receive beams 744 to determine the position of a target and to track the target's motion. For example, to track vehicles or personnel movements in a law enforcement or military application. Some examples of target detection information may include target detection information in three dimensions, the three dimensions may include position or location such as range, azimuth, and elevation in relation to the radar system. Target location may be determined as grid coordinates, such as latitude and longitude, as well as elevation. Other target detection information may include distance, speed, elevation, acceleration, size, or any combination.

The processing circuitry may be further operable to determine characteristics of features in the sub-area covered by each respective receive beam 744. Some characteristics of ground-based features may include size, shape, location, and density. For example, a solid metal object may appear differently on the display than a wooden or similar object that has lower radar reflectivity. In other examples, portable radar system 10 may perform Doppler analysis of a target's movement. In some examples, the signal processing circuitry may be operable to determine one or more characteristics of a second sub-area simultaneously with determining characteristics of the first sub-area. As one example, the first receive beam may track the movement and location of a first target and the processing circuitry may use the second receive beam to simultaneously perform Doppler analysis on a second target.

Figure 12:
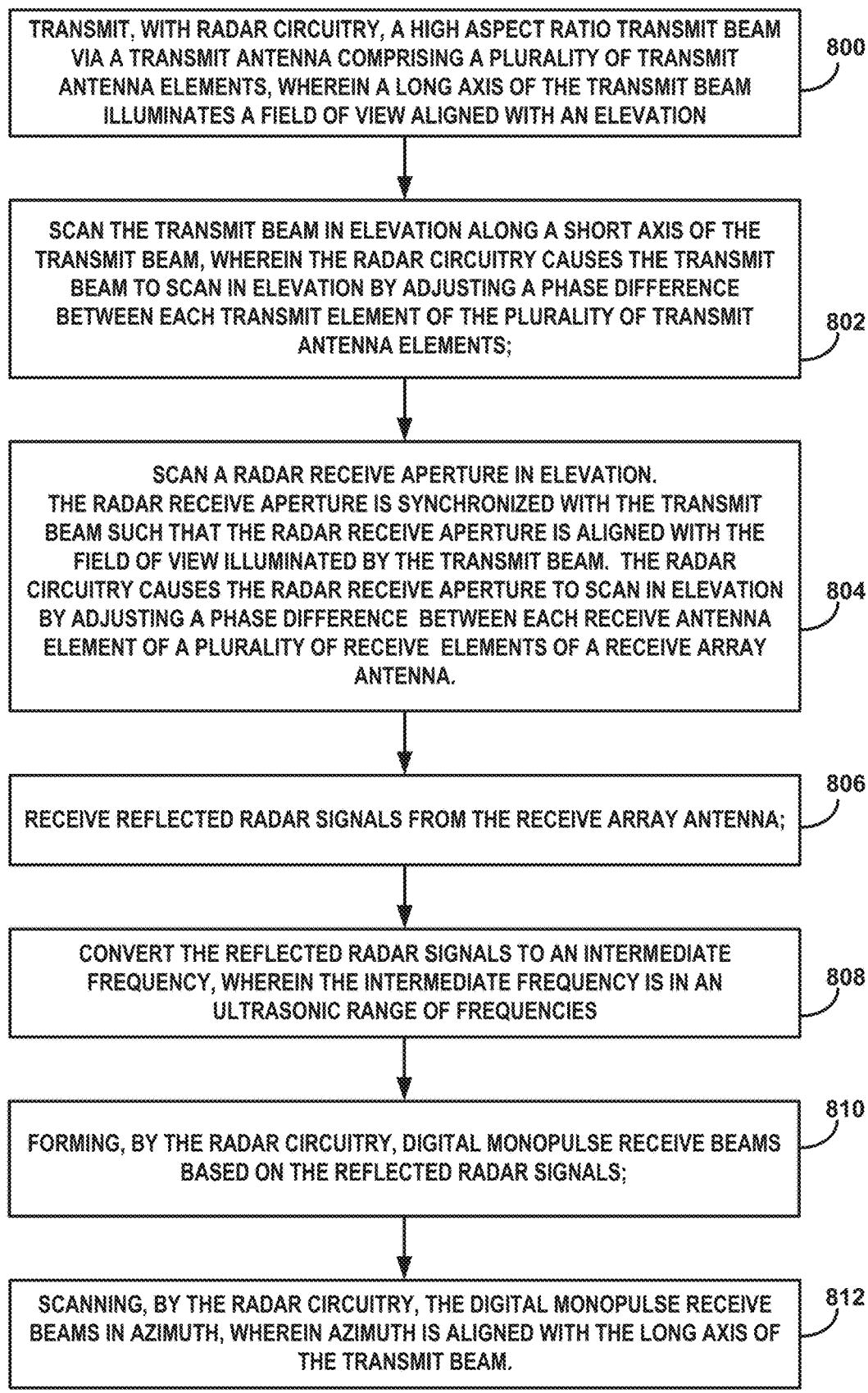
FIG. 12 is a flowchart illustrating an example operation of a radar system according to one or more techniques of this disclosure.

FIG. 12 is a flowchart illustrating an example operation of a radar system according to one or more techniques of this disclosure. The example of FIG. 12 describes a method of operating a FMCW radar system including antenna systems such as systems 400 and 450 described above in relation to FIGS. 3D and 4.

The radar circuitry of the radar system may transmit a high aspect ratio transmit beam, e.g. transmit beam 742 depicted in FIG. 11 via a transmit antenna, which is separate from the radar system receive antenna (800). The radar circuitry to transmit the beam may include transmitter circuitry 560 as well as feed network 502 depicted in FIGS. 5A and 5B. In addition to the feed network, the transmit antenna may include a plurality of transmit antenna elements such as transmitter elements 538 and 406A depicted in FIGS. 5B and 3D. In some examples, a long axis of the transmit beam may illuminate a field of view aligned with an azimuth, as shown in FIG. 11.

The radar circuitry may scan the transmit beam in elevation along a short axis of the transmit beam, e.g. in the second illumination direction 745 shown in FIG. 11 (802). The radar circuitry may cause the transmit beam to scan in elevation by adjusting a phase difference between each transmit element of the plurality of transmit antenna elements as described above in relation to the varactor phase shifters in FIG. 2 and the multi-channel control devices in relation to FIG. 4.

The radar circuity may scan a RF radar receive aperture in elevation, as described above in relation to FIGS. 1, 4 and 11 (804). The radar receive aperture may be synchronized with the transmit beam such that the radar receive aperture is aligned with the field of view illuminated by the transmit beam. As with the transmit beam, the radar circuitry may cause the radar receive aperture to scan in elevation by adjusting a phase difference between each receive antenna element of a plurality of receive elements of a receive array antenna.

The radar circuitry, such as receiver circuitry 660 depicted in FIG. 6B, and, is configured to receive reflected radar signals from the receive array antenna, which may include receive antenna elements 638 and 640, the receiver feed network as depicted in FIGS. 3D, 4 and 6A and 6B (806). The radar circuitry may convert the reflected radar signals to an intermediate frequency (808). In some examples the intermediate frequency is in an ultrasonic range of frequencies such as approximately eight MHz to 20 MHz, for example 16 MHz.

The radar circuitry may form digital monopulse receive beams based on the reflected radar signals (810). In other words, the signal processing circuitry may use digital beam forming techniques to generate monopulse receive beams within the receiver circuitry. The radar circuitry may scan the digital monopulse receive beams in azimuth, azimuth is aligned with the long axis of the transmit beam (812). In this manner, by using RF beam forming techniques to scan the radar receive aperture combined with digital beam forming within the receiver circuitry, a radar system, according to this disclosure may scan in both azimuth and elevation. In addition, as described above in relation to FIG. 4, in some examples, a radar system of this disclosure may also estimate target angles based on MIMO techniques.

The techniques of this disclosure may also be described in the following examples.

Example 1. A frequency modulated continuous wave (FMCW) transmit antenna array device, the device comprising: a first antenna element and a second antenna element; a first power divider comprising: a first input terminal; a first output terminal coupled to first antenna element; and a second output terminal; a second power divider, comprising: a second input terminal; a third output terminal coupled to second antenna element; and a fourth output terminal; and a phase shifter, wherein the phase shifter comprises: a phase shifter output terminal connected to the second input terminal of the second power divider; a 90-degree hybrid coupler with: a phase shifter input terminal connected to the second output terminal of the first power divider; a 90-degree output terminal; an isolated terminal; a first varactor that connects the 90-degree output terminal to ground; and a second varactor that connects the isolated terminal to ground.

Example 2. The device of example 1, wherein the 90-degree hybrid coupler is a first 90-degree hybrid coupler, the phase shifter further comprising: a stage connector element with a fixed 45-degree phase shift at the frequency of interest f1; a second 90-degree hybrid coupler with: a coupler input terminal connected to an output terminal of the first 90-degree hybrid coupler through the stage connector element; a second 90-degree output terminal; a second isolated terminal; a third varactor that connects the second 90-degree output terminal to ground; and a fourth varactor that connects the second isolated terminal to ground.

Example 3. The device of any combination of examples 1-2, wherein the 90-degree hybrid coupler is a first 90-degree hybrid coupler stage, the phase shifter further comprising a plurality of 90-degree hybrid coupler stages, and wherein an input terminal of a respective 90-degree hybrid coupler stage couples to an output of a respective preceding 90-degree hybrid coupler stage through a stage connector element.

Example 4. The device of any combination of examples 1-3, wherein the first power divider is an unequal power divider, wherein a magnitude of power output to the second output terminal is greater than a magnitude of power output to the first antenna element via the first output terminal.

Example 5. The device of any combination of examples 1-4, wherein the phase shifter is a first phase shifter, wherein the first antenna element and the second antenna element are the first antenna element and the second antenna element of a plurality of antenna elements, and wherein the plurality of antenna elements comprises a last antenna element and wherein the first power divider and the second power divider are the first power divider and the second power divider of a plurality of power dividers, wherein the plurality of power dividers comprises a last power divider, wherein the last power divider outputs power to a third antenna element of the plurality of antenna elements and outputs power to the last antenna element through a second phase shifter.

Example 6. The device of any combination of examples 1-5, wherein the device is included in a system, and wherein the phase shifter is a first transmit phase shifter and the 90-degree coupler is a first 90-degree coupler comprising a first phase shifter input terminal, a first 90-degree output terminal, and a first isolated terminal, the system further comprising: a receive antenna array separate from the transmit antenna array device, the receive antenna array comprising: a first antenna receive element; a second antenna receive element; a third power divider comprising: a third input terminal; a third output terminal coupled to first antenna receive element; and a fourth output terminal; a fourth power divider comprising: a fourth input terminal; a fifth output terminal coupled to the second antenna receive element; and a sixth output terminal; and a second phase shifter, wherein the second phase shifter comprises: a second phase shifter output terminal connected to the fourth input terminal of the fourth power divider; a second 90-degree hybrid coupler with: a second phase shifter input terminal connected to the fourth output terminal of the third power divider; a second 90-degree output terminal; a second isolated terminal; a first varactor that connects the second 90-degree output terminal to ground; and a second varactor that connects the second isolated terminal to ground.

Example 7. The device of any combination of examples 1-7, comprising a multi-layer circuit board including a first layer and a second layer, wherein: the plurality of transmit antenna elements is located on the first layer; the first antenna receive element and the second antenna receive element are located on the first layer; the first power divider and the second power divider are located on the second layer.

Example 8. The device of any combination of examples 1-7, wherein the system further comprises: radar transmitter circuitry configured to: output a high aspect ratio transmit beam with a short axis of the transmit beam aligned with elevation and a long axis of the transmit beam aligned with azimuth; and configured to scan the transmit beam in elevation parallel to the short axis; and radar receiver circuitry configured to scan a radar receiver aperture in elevation such that the radar receiver aperture is configured to receive reflected radar signals transmitted in the transmit beam, wherein the radar receiver circuitry is configured to scan the radar receiver aperture by adjusting a phase shift magnitude of the phase shifter.

Example 9. The device of any combination of examples 1-8, wherein the radar receiver circuitry is further configured to: convert the reflected radar signals received at the receive array antenna to an intermediate frequency; process the converted reflected radar signals to form digital monopulse receive beams; electronically scan the receive beams in azimuth at the intermediate frequency.

Example 10. The device of any combination of examples 1-9, wherein the 90-degree hybrid coupler is a first 90-degree hybrid coupler stage, the phase shifter further comprising a plurality of 90-degree hybrid coupler stages, and wherein an input terminal of a respective 90-degree hybrid coupler stage couples to an output of a respective preceding 90-degree hybrid coupler stage through a stage connector element.

Example 11. A device comprising: a frequency modulated continuous wave (FMCW) transmit antenna comprising: a plurality of transmit antenna elements aligned in a single column; a first multi-channel control device, comprising a first input terminal configured to receive a transmit signal from a power divider, the first multi-channel control device configured to individually adjust the phase and adjust the amplitude of the transmit signal through each respective channel, wherein each respective channel is connected to a respective transmit antenna element of a first group of transmit antenna elements of the plurality of transmit antenna elements; and a second multi-channel control device, comprising a second input terminal configured to receive the transmit signal from the power divider, the second multi-channel control device configured to individually adjust the phase and amplitude of the transmit signal through each respective channel of the second multi-channel control device, wherein each respective channel is connected to a respective transmit antenna element of a second group of transmit antenna elements of the plurality of transmit antenna elements, a receive array antenna separate from the transmit antenna, wherein the receive array antenna is configured to receive reflected FMCW transmit signals.

Example 12. The device of example 11, wherein the first control device and the second control device each comprise: four output channels, wherein each respective output channel comprises: an output terminal connected to a respective transmit antenna element of the plurality of transmit antenna elements; an amplitude control circuit, connected to the output terminal and configured to adjust an amplitude of the transmit signal for the respective output channel independently from any other output channel; and a phase control circuit, connected to the amplitude control circuit and configured to adjust a phase of the transmit signal for the respective output channel independently from any other output channel.

Example 13. The device of any combination of examples 11-12, wherein the receive array antenna comprises: a multi-layer circuit board; a plurality of receive antenna elements aligned in a single column on a first layer of the multi-layer circuit board; a third multi-channel control device located on a second layer of the multi-layer circuit board, the third multi-channel control device comprising: a first receive channel: including an input terminal coupled to both a first receive antenna element and a second receive antenna element of the plurality of receive antenna elements; a configured to individually adjust the phase and adjust the amplitude of received reflected transmit signals from the both the first receive antenna element and the second receive antenna element; an output terminal configured to output a signal comprising the received reflected transmit signals.

Example 14. The device of any combination of examples 11-13, the third multi-channel control device further comprises: a second receive channel: including an input terminal coupled to both a third receive antenna element and a fourth receive antenna element of the plurality of receive antenna elements; a configured to individually adjust the phase and adjust the amplitude of received reflected transmit signals from the both the third receive antenna element and the fourth receive antenna element; and wherein the output terminal is further configured to output the signal, and wherein the signal comprises the received reflected transmit signals from both the first receive channel and the second receive channel.

Example 15. The device of any combination of examples 11-14, wherein the receive array antenna further comprises a fourth multi-channel control device located on the second layer of the multi-layer circuit board, the fourth multi-channel control device comprising: a third receive channel: including an input terminal coupled to both a third receive antenna element and a fourth receive antenna element of the plurality of receive antenna elements; a configured to individually adjust the phase and adjust the amplitude of received reflected transmit signals from the both the third receive antenna element and the fourth receive antenna element; a second output terminal configured to output a signal comprising the received reflected transmit signals from the both the third receive antenna element and the fourth receive antenna element.

Example 16. The device of any combination of examples 11-15, wherein the single column of receive antenna elements on the first layer of the multi-layer circuit board is a first column, the receive array antenna further comprising: a second plurality of receive antenna elements located on the first layer of the multi-layer circuit board aligned in a second column; a fourth multi-channel control device and a fifth third multi-channel control device located on the second layer of the multi-layer circuit board, wherein: each channel of the fourth multi-channel control device is configured to receive reflected transmit signals from a respective pair of receive antenna elements of the second plurality of receive antenna elements, each channel of the fifth multi-channel control device is configured to receive reflected transmit signals from a respective pair of receive antenna elements of the second plurality of receive antenna elements, and wherein each respective pair of receive antenna elements is coupled to one and only one respective channel of the fourth multi-channel control device and the fifth third multi-channel control device.

Example 17. The device of any combination of examples 11-16, wherein the plurality of transmit antenna elements is located on the first layer of the multi-layer circuit board and wherein the first multi-channel control device and the second multi-channel control device is located on the second layer.

Example 18. The device of any combination of examples 11-17, wherein the transmit antenna is configured to scan a high aspect ratio transmit beam in direction perpendicular to a long axis of the single column of transmit antenna elements based on a respective adjusted phase and a respective adjusted amplitude of each respective channel of the first multi-channel control device and the second multi-channel control device.

Example 19. The device of any combination of examples 11-18, wherein transmit antenna is configured to scan the high aspect ratio transmit beam in elevation.

Example 20. The device of any combination of examples 11-19, wherein the device is included in a system, the system further comprising: radar transmitter circuitry configured to output frequency modulated continuous wave (FMCW) transmit signals to the transmit antenna; and radar receiver circuitry operatively coupled to the radar receiver antenna, wherein the receive array antenna is configured to output the received reflected transmit signals to the radar receiver circuitry.

Example 21. The device of any combination of examples 11-20, wherein: the radar transmitter circuitry is configured to: output a high aspect ratio transmit beam with a long axis of the transmit beam aligned with azimuth and a short axis of the transmit beam aligned with elevation; and scan the transmit beam in elevation parallel to the short axis, wherein the radar transmitter circuitry is configured to scan the radar transmit beam by individually adjusting the phase and adjusting the amplitude of the transmit signal through each respective channel; and the radar receiver circuitry is configured to scan a radar receiver aperture in elevation such that the radar receiver aperture is configured to receive reflected radar signals transmitted from the transmit beam.

Example 22. The device of any combination of examples 11-21, wherein the radar receiver circuitry is further configured to: convert the reflected radar signals received at the receive array antenna to an intermediate frequency; process the converted reflected radar signals to form digital monopulse receive beams; electronically scan the receive beams in azimuth at the intermediate frequency.

Example 23. A method of operating a frequency modulated continuous wave (FMCW) radar system, the method comprising: transmitting, by radar circuitry, a high aspect ratio transmit beam via a transmit antenna comprising a plurality of transmit antenna elements, wherein a long axis of the transmit beam illuminates a field of view aligned with an azimuth; scanning, by the radar circuitry, the transmit beam in elevation along a short axis of the transmit beam, wherein the radar circuitry causes the transmit beam to scan in elevation by adjusting a phase difference between each transmit element of the plurality of transmit antenna elements; scanning, by the radar circuitry, a radar receive aperture in elevation, wherein: the radar receive aperture is synchronized with the transmit beam such that the radar receive aperture is aligned with the field of view illuminated by the transmit beam, and wherein the radar circuitry causes the radar receive aperture to scan in elevation by adjusting a phase difference between each receive antenna element of a plurality of receive elements of a receive array antenna; receiving, by the radar circuitry, reflected radar signals from the receive array antenna; converting, by the radar circuitry, the reflected radar signals to an intermediate frequency, wherein the intermediate frequency is in an ultrasonic range of frequencies; forming, by the radar circuitry, digital monopulse receive beams based on the reflected radar signals; and scanning, by the radar circuitry, the digital monopulse receive beams in azimuth, wherein azimuth is aligned with the long axis of the transmit beam.

Example 24. The method of example 23, wherein the ultrasonic frequency range is a passband that includes sixteen megahertz.

Various examples of the disclosure have been described. These and other examples are within the scope of the following claims.

What is claimed is:

1. A device comprising:
   a frequency modulated continuous wave (FMCW) transmit antenna comprising:
      a plurality of transmit antenna elements aligned in a single column;
      a first multi-channel control device, comprising a first input terminal configured to receive a transmit signal from a power divider, the first multi-channel control device configured to perform electronic elevation scanning, wherein to perform the electronic elevation scanning, the first multi-channel control device is configured to individually adjust a phase and adjust an amplitude of the transmit signal through each respective channel of the first multi-channel control device, wherein each respective channel of the first multi-channel control device is connected to a respective transmit antenna element of a first group of transmit antenna elements of the plurality of transmit antenna elements; and
      a second multi-channel control device, comprising a second input terminal configured to receive the transmit signal from the power divider, the second multi-channel control device configured to perform the electronic elevation scanning, wherein to perform the electronic elevation scanning, the second multi-channel control device is configured to individually adjust the phase and the amplitude of the transmit signal through each respective channel of the second multi-channel control device, wherein each respective channel of the second multi-channel control device is connected to a respective transmit antenna element of a second group of transmit antenna elements of the plurality of transmit antenna elements; and
   a receive array antenna separate from the transmit antenna, wherein the receive array antenna is configured to receive reflected FMCW transmit signals, wherein the receive array antenna comprises:
      a multi-layer circuit board;
      a first plurality of receive antenna elements located on a first layer of the multi-layer circuit board aligned in a first column and a second plurality of receive antenna elements located on the first layer of the multi-layer circuit board aligned in a second column;
      a third multi-channel control device located on a second layer of the multi-layer circuit board, the third multi-channel control device comprising:
         a first receive channel including an input terminal coupled to both a first receive antenna element and a second receive antenna element of the first plurality of receive antenna elements;
         a first multi-mode integrated circuit configured to individually adjust the phase and adjust the amplitude of received reflected transmit signals from both the first receive antenna element and the second receive antenna element;
      a fourth multi-channel control device and a fifth multi-channel control device located on the second layer of the multi-layer circuit board, wherein each channel of the fourth multi-channel control device is configured to receive reflected transmit signals from a respective pair of receive antenna elements of the second plurality of receive antenna elements, each channel of the fifth multi-channel control device is configured to receive reflected transmit signals from a respective pair of receive antenna elements of the second plurality of receive antenna elements, and each respective pair of receive antenna elements is coupled to only one respective channel of the fourth multi-channel control device and the fifth multi-channel control device; and
      an output terminal configured to output a signal comprising the received reflected transmit signals.

2. The device of claim 1, wherein the first multi-channel control device and the second multi-channel control device each comprise:
   four output channels, wherein each respective output channel comprises:
      an output terminal connected to a respective transmit antenna element of the plurality of transmit antenna elements;
      an amplitude control circuit, connected to the output terminal and configured to adjust an amplitude of the transmit signal for the respective output channel independently from any other output channel; and
      a phase control circuit connected to the amplitude control circuit and configured to adjust a phase of the transmit signal for the respective output channel independently from any other output channel.

3. The device of claim 1, wherein the transmit antenna is configured to scan a high aspect ratio transmit beam in a direction perpendicular to a long axis of the single column of transmit antenna elements based on a respective adjusted phase and a respective adjusted amplitude of each respective channel of the first multi-channel control device and the second multi-channel control device.

4. The device of claim 1, wherein the device is included in a system, the system further comprising:
   radar transmitter circuitry configured to output frequency modulated continuous wave (FMCW) transmit signals to the transmit antenna;
   radar receiver circuitry operatively coupled to the receive array antenna, wherein the receive array antenna is configured to output the received reflected transmit signals to the radar receiver circuitry.

5. The device of claim 4, wherein:
the radar transmitter circuitry is configured to:
  output a high aspect ratio transmit beam with a short axis of the high aspect ratio transmit beam aligned with elevation and a long axis of the transmit beam aligned with azimuth; and
  scan the high aspect ratio transmit beam in elevation parallel to the short axis, wherein the radar transmitter circuitry is configured to scan the high aspect ratio transmit beam by individually adjusting the phase and adjusting the amplitude of the transmit signal through each respective channel; and
the radar receiver circuitry is configured to scan a radar receiver aperture in elevation such that the radar receiver aperture is configured to receive reflected radar signals transmitted from the transmit beam.

6. The device of claim 5, wherein the radar receiver circuitry is further configured to:
  convert the reflected radar signals received at the receive array antenna to an intermediate frequency;
  process the converted reflected radar signals to form digital monopulse receive beams;
  electronically scan the receive beams in azimuth at the intermediate frequency.

7. A device comprising:
a frequency modulated continuous wave (FMCW) transmit antenna comprising:
  a plurality of transmit antenna elements aligned in a single column;
  a first multi-channel control device, comprising a first input terminal configured to receive a transmit signal from a power divider, the first multi-channel control device configured to perform electronic elevation scanning, wherein to perform the electronic elevation scanning, the first multi-channel control device is configured to individually adjust a phase and adjust an amplitude of the transmit signal through each respective channel of the first multi-channel control device, wherein each respective channel of the first multi-channel control device is connected to a respective transmit antenna element of a first group of transmit antenna elements of the plurality of transmit antenna elements; and
  a second multi-channel control device, comprising a second input terminal configured to receive the transmit signal from the power divider, the second multi-channel control device configured to perform the electronic elevation scanning, wherein to perform the electronic elevation scanning, the second multi-channel control device is configured to individually adjust the phase and the amplitude of the transmit signal through each respective channel of the second multi-channel control device, wherein each respective channel of the second multi-channel control device is connected to a respective transmit antenna element of a second group of transmit antenna elements of the plurality of transmit antenna elements,
a receive array antenna separate from the transmit antenna, the receive array antenna comprising:
a multi-layer circuit board;
a plurality of receive antenna elements aligned in a single column on a first layer of the multi-layer circuit board;
a third multi-channel control device located on a second layer of the multi-layer circuit board, the third multi-channel control device comprising:
  a first receive channel including an input terminal coupled to both a first receive antenna element and a second receive antenna element of the plurality of receive antenna elements;
  a first multi-mode integrated circuit configured to individually adjust the phase and adjust the amplitude of received reflected transmit signals from both the first receive antenna element and the second receive antenna element;
  a second receive channel including an input terminal coupled to both a third receive antenna element and a fourth receive antenna element of the plurality of receive antenna elements;
  a second multi-mode integrated circuit configured to individually adjust the phase and adjust the amplitude of received reflected transmit signals from the both the third receive antenna element and the fourth receive antenna element;
  an output terminal configured to output a signal comprising the received reflected transmit signals from both the first receive channel and the second receive channel.

8. The device of claim 7, wherein the FMCW transmit antenna is configured to scan a high aspect ratio transmit beam in a direction perpendicular to a long axis of the single column of transmit antenna elements based on a respective adjusted phase and a respective adjusted amplitude of each respective channel of the first multi-channel control device and the second multi-channel control device.

9. The device of claim 7, wherein the device is included in a system, the system further comprising:
  radar transmitter circuitry configured to output frequency modulated continuous wave (FMCW) transmit signals to the transmit antenna;
  radar receiver circuitry operatively coupled to the receive array antenna, wherein the receive array antenna is configured to output the received reflected transmit signals to the radar receiver circuitry.

10. The device of claim 9, wherein:
the radar transmitter circuitry is configured to:
  output a high aspect ratio transmit beam with a short axis of the high aspect ratio transmit beam aligned with elevation and a long axis of the transmit beam aligned with azimuth; and
  scan the high aspect ratio transmit beam in elevation parallel to the short axis, wherein the radar transmitter circuitry is configured to scan the high aspect ratio transmit beam by individually adjusting the phase and adjusting the amplitude of the transmit signal through each respective channel; and
the radar receiver circuitry is configured to scan a radar receiver aperture in elevation such that the radar receiver aperture is configured to receive reflected radar signals transmitted from the transmit beam.

11. The device of claim 10, wherein the radar receiver circuitry is further configured to:
  convert the reflected radar signals received at the receive array antenna to an intermediate frequency;
  process the converted reflected radar signals to form digital monopulse receive beams;
  electronically scan the receive beams in azimuth at the intermediate frequency.

12. The device of claim 7, wherein the first multi-channel control device and the second multi-channel control device each comprise:
- four output channels, wherein each respective output channel comprises:
    - an output terminal connected to a respective transmit antenna element of the plurality of transmit antenna elements;
    - an amplitude control circuit, connected to the output terminal and configured to adjust an amplitude of the transmit signal for the respective output channel independently from any other output channel; and
    - a phase control circuit connected to the amplitude control circuit and configured to adjust a phase of the transmit signal for the respective output channel independently from any other output channel.

\* \* \* \* \*